United States Patent
Shaked et al.

(10) Patent No.: US 12,126,466 B2
(45) Date of Patent: Oct. 22, 2024

(54) CHANNEL STATE FEEDBACK USING DEMODULATION REFERENCE SIGNALS

(71) Applicant: QUALCOMM Incorporated, San Diego, CA (US)

(72) Inventors: Ronen Shaked, Kfar Saba (IL); Aviv Regev, Tel Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 352 days.

(21) Appl. No.: 17/690,315

(22) Filed: Mar. 9, 2022

(65) Prior Publication Data

US 2023/0291612 A1 Sep. 14, 2023

(51) Int. Cl.
*H04L 25/02* (2006.01)
*H04B 7/06* (2006.01)
*H04L 5/00* (2006.01)

(52) U.S. Cl.
CPC ....... *H04L 25/0228* (2013.01); *H04B 7/0626* (2013.01); *H04L 5/0048* (2013.01)

(58) Field of Classification Search
CPC . H04B 7/0456; H04B 7/0626; H04L 25/0228; H04L 25/03898; H04L 5/0048; H04L 5/0051; H04L 5/0055; H04L 5/0057
See application file for complete search history.

(56) References Cited

U.S. PATENT DOCUMENTS

| | | | | |
|---|---|---|---|---|
| 9,130,616 B2 * | 9/2015 | Taoka | ................... | H04B 7/0639 |
| 9,479,965 B2 * | 10/2016 | Seo | ........................ | H04L 5/0053 |
| 10,141,988 B1 * | 11/2018 | Hessler | ................. | H04B 7/0478 |
| 10,862,558 B1 * | 12/2020 | Aminikashani | ...... | H04B 7/0691 |
| 11,924,863 B2 * | 3/2024 | Huang | ................... | H04W 72/23 |
| 2008/0310353 A1 * | 12/2008 | Love | ...................... | H04W 72/20 370/329 |
| 2010/0183085 A1 * | 7/2010 | Taoka | ................... | H04B 7/0417 375/260 |
| 2011/0142144 A1 * | 6/2011 | Allpress | ............... | H04B 7/0413 375/259 |
| 2011/0216846 A1 * | 9/2011 | Lee | ...................... | H04B 7/0473 375/295 |
| 2011/0235586 A1 * | 9/2011 | Han | .................... | H04L 25/0391 370/328 |
| 2011/0280197 A1 * | 11/2011 | Brueck | ................ | H04B 7/0452 370/329 |
| 2012/0033755 A1 * | 2/2012 | Ringstrom | ................ | H04L 1/00 375/267 |

(Continued)

*Primary Examiner* — Dung B Huynh

(74) *Attorney, Agent, or Firm* — Holland & Hart LLP

(57) ABSTRACT

Methods, systems, and devices for wireless communications are described. A user equipment (UE) may monitor for a demodulation reference signal (DMRS) according to a default precoder, where the DMRS is associated with channel state feedback (CSF) information. The UE may perform a channel estimation based on the DMRS, and transmit an uplink message indicating one or more candidate precoders, where the one or more candidate precoders are selected based on the channel estimation. The UE may receive a downlink message indicating a precoder of the one or more candidate precoders based on transmitting the uplink message. The UE may then communicate with a network entity in accordance with the indicated precoder based on receiving the downlink message.

30 Claims, 15 Drawing Sheets

(56) References Cited

U.S. PATENT DOCUMENTS

| | | | |
|---|---|---|---|
| 2012/0099674 A1* | 4/2012 | Moulsley | H04B 7/0669 375/296 |
| 2012/0106470 A1* | 5/2012 | Clerckx | H04B 7/0456 370/329 |
| 2013/0022021 A1* | 1/2013 | Wild | H04B 7/0639 370/330 |
| 2013/0208695 A1* | 8/2013 | Jang | H04W 72/20 370/329 |
| 2014/0003395 A1* | 1/2014 | Hsu | H04B 7/0478 370/335 |
| 2014/0086285 A1* | 3/2014 | Yang | H04B 7/0417 375/219 |
| 2014/0177745 A1* | 6/2014 | Krishnamurthy | H04B 7/063 375/267 |
| 2014/0301343 A1* | 10/2014 | Park | H04L 5/0055 370/329 |
| 2016/0028519 A1* | 1/2016 | Wei | H04B 7/0456 375/267 |
| 2016/0050001 A1* | 2/2016 | Kang | H04B 7/0421 370/329 |
| 2016/0050003 A1* | 2/2016 | Ko | H04B 7/0417 370/329 |
| 2016/0226647 A1* | 8/2016 | Wang | H04L 1/0009 |
| 2016/0337023 A1* | 11/2016 | Yi | H04B 7/0632 |
| 2017/0141823 A1* | 5/2017 | Fodor | H04B 7/0404 |
| 2017/0141831 A1* | 5/2017 | Rico Alvarino | H04B 7/0639 |
| 2017/0230994 A1* | 8/2017 | You | H04L 5/0053 |
| 2017/0288751 A1* | 10/2017 | Faxér | H04B 7/0452 |
| 2017/0310372 A1* | 10/2017 | Wu | H04W 88/08 |
| 2018/0048366 A1* | 2/2018 | Sundararajan | H04B 7/0689 |
| 2018/0054244 A1* | 2/2018 | Kim | H04B 7/0626 |
| 2018/0091197 A1* | 3/2018 | Huang | H04B 7/0456 |
| 2018/0092064 A1* | 3/2018 | Ryu | H04W 56/001 |
| 2018/0123659 A1* | 5/2018 | Qian | H04B 7/0626 |
| 2018/0131418 A1* | 5/2018 | Wang | H04B 7/0452 |
| 2018/0131420 A1* | 5/2018 | Faxér | H04B 7/0469 |
| 2018/0132255 A1* | 5/2018 | Hessler | H04W 72/56 |
| 2018/0205437 A1* | 7/2018 | Kim | H04B 7/0639 |
| 2018/0227156 A1* | 8/2018 | Papasakellariou | H04W 72/0453 |
| 2018/0262244 A1* | 9/2018 | Noh | H04B 7/063 |
| 2018/0279289 A1* | 9/2018 | Islam | H04W 72/0446 |
| 2018/0279293 A1* | 9/2018 | Harrison | H04B 7/0639 |
| 2018/0295631 A1* | 10/2018 | Fröberg Olsson | H04B 7/0658 |
| 2018/0375625 A1* | 12/2018 | Luo | H04L 5/0051 |
| 2019/0021144 A1* | 1/2019 | Li | F24C 7/08 |
| 2019/0044599 A1* | 2/2019 | Kakishima | H04B 7/0632 |
| 2019/0173533 A1* | 6/2019 | Kim | H04B 7/0695 |
| 2019/0181934 A1* | 6/2019 | Kang | H04B 7/0456 |
| 2019/0190569 A1* | 6/2019 | Nayeb Nazar | H04B 7/0639 |
| 2019/0199553 A1* | 6/2019 | Park | H04B 7/0695 |
| 2019/0207661 A1* | 7/2019 | Fröberg Olsson | H04B 17/373 |
| 2019/0207731 A1* | 7/2019 | Park | H04B 7/0456 |
| 2019/0229785 A1* | 7/2019 | Wang | H04B 7/0456 |
| 2019/0229788 A1* | 7/2019 | Zhang | H04L 5/0098 |
| 2019/0335475 A1* | 10/2019 | Liang | H04W 72/541 |
| 2019/0357159 A1* | 11/2019 | Pan | H04L 5/0053 |
| 2019/0386718 A1* | 12/2019 | Sengupta | H04B 7/0452 |
| 2020/0029327 A1* | 1/2020 | Bharadwaj | H04L 5/0044 |
| 2020/0052751 A1* | 2/2020 | Nammi | H04B 7/0634 |
| 2020/0052761 A1* | 2/2020 | Nammi | H04B 7/0486 |
| 2020/0106491 A1* | 4/2020 | Wu | H04L 1/16 |
| 2020/0106656 A1* | 4/2020 | Nammi | H04W 72/04 |
| 2020/0112419 A1* | 4/2020 | Bagheri | H04L 5/0057 |
| 2020/0119784 A1* | 4/2020 | Lu | H04B 7/0456 |
| 2020/0178304 A1* | 6/2020 | Chen | H04L 1/1819 |
| 2020/0186303 A1* | 6/2020 | Hao | H04B 7/0626 |
| 2020/0204224 A1* | 6/2020 | Kang | H04L 5/0094 |
| 2020/0212972 A1* | 7/2020 | Zhang | H04L 5/0048 |
| 2020/0212974 A1* | 7/2020 | Wu | H04L 5/0051 |
| 2020/0274585 A1* | 8/2020 | Huang | H04B 7/0456 |
| 2020/0326675 A1* | 10/2020 | Martin | H04L 67/60 |
| 2020/0336187 A1* | 10/2020 | Hu | H04B 7/0469 |
| 2020/0336264 A1* | 10/2020 | Faxér | H04B 7/0617 |
| 2020/0350958 A1* | 11/2020 | Zhou | H04L 1/1864 |
| 2020/0413488 A1* | 12/2020 | Han | H04W 88/10 |
| 2021/0069814 A1* | 3/2021 | Sickels | B23K 9/1062 |
| 2021/0084677 A1* | 3/2021 | Wänstedt | H04W 4/06 |
| 2021/0099214 A1* | 4/2021 | Ren | H04W 72/563 |
| 2021/0105749 A1* | 4/2021 | Zhou | H04L 5/0023 |
| 2021/0127408 A1* | 4/2021 | Huang | H04W 72/23 |
| 2021/0153102 A1* | 5/2021 | Sarkis | H04W 48/02 |
| 2021/0203392 A1* | 7/2021 | Kwak | H04B 7/0478 |
| 2021/0211893 A1* | 7/2021 | Shao | H04W 72/23 |
| 2021/0273760 A1* | 9/2021 | Yan | H04B 7/0456 |
| 2021/0274578 A1* | 9/2021 | Yum | H04L 1/0001 |
| 2021/0297118 A1* | 9/2021 | Kwak | H04B 7/0632 |
| 2021/0306123 A1* | 9/2021 | Gao | H04L 27/2613 |
| 2021/0314122 A1* | 10/2021 | Jin | H04L 5/005 |
| 2021/0320768 A1* | 10/2021 | Yuan | H04L 5/0073 |
| 2021/0336660 A1* | 10/2021 | Faxér | H04B 7/0417 |
| 2021/0376984 A1* | 12/2021 | Wei | H04L 5/0053 |
| 2022/0006495 A1* | 1/2022 | Liu | H04B 7/0456 |
| 2022/0069870 A1* | 3/2022 | Bian | H04B 7/0639 |
| 2022/0094411 A1* | 3/2022 | Yoo | H04L 25/0254 |
| 2022/0109475 A1* | 4/2022 | Soriaga | H04W 24/10 |
| 2022/0123813 A1* | 4/2022 | Bian | H04L 1/08 |
| 2022/0140970 A1* | 5/2022 | Saggar | H04W 72/20 370/329 |
| 2022/0149911 A1* | 5/2022 | Li | H04B 7/0626 |
| 2022/0200757 A1* | 6/2022 | Guo | H04L 5/0044 |
| 2022/0232633 A1* | 7/2022 | Sun | H04L 1/1812 |
| 2022/0303957 A1* | 9/2022 | Elshafie | H04L 5/0053 |
| 2022/0376862 A1* | 11/2022 | Cao | H04B 7/0626 |
| 2022/0385381 A1* | 12/2022 | MolavianJazi | H04W 72/54 |
| 2022/0386338 A1* | 12/2022 | Li | H04L 5/0091 |
| 2022/0400471 A1* | 12/2022 | Hu | H04L 5/0048 |
| 2022/0416856 A1* | 12/2022 | Yu | H04L 5/0094 |
| 2023/0078895 A1* | 3/2023 | Wu | H04L 5/0094 370/329 |
| 2023/0179380 A1* | 6/2023 | Huang | H04L 5/0057 370/252 |
| 2023/0188190 A1* | 6/2023 | Zhu | H04L 1/0026 370/329 |
| 2023/0188289 A1* | 6/2023 | Abdelghaffar | H04W 24/08 370/252 |
| 2023/0224726 A1* | 7/2023 | Kim | H04L 5/0053 370/329 |
| 2023/0239111 A1* | 7/2023 | Jin | H04L 25/0246 |
| 2023/0246691 A1* | 8/2023 | Huang | H04L 27/261 375/262 |
| 2023/0254184 A1* | 8/2023 | Lopez | H04L 25/0226 375/224 |
| 2023/0275627 A1* | 8/2023 | Lopez | H04B 7/0456 375/267 |
| 2023/0276457 A1* | 8/2023 | Wang | H04W 72/563 370/329 |
| 2023/0300652 A1* | 9/2023 | Huang | H04B 17/345 370/252 |
| 2023/0318667 A1* | 10/2023 | Frenger | H04L 5/006 370/330 |
| 2023/0379020 A1* | 11/2023 | Wang | H04B 7/0663 |
| 2024/0022306 A1* | 1/2024 | Wang | H04B 7/0639 |
| 2024/0048214 A1* | 2/2024 | Kwon | H04B 7/088 |
| 2024/0063973 A1* | 2/2024 | Baskaran | H04B 7/0628 |
| 2024/0073909 A1* | 2/2024 | Harrison | H04B 7/0639 |
| 2024/0088954 A1* | 3/2024 | Athley | H04B 7/0621 |
| 2024/0098738 A1* | 3/2024 | Fang | H04W 72/1268 |

* cited by examiner

CHANNEL STATE FEEDBACK USING DEMODULATION REFERENCE SIGNALS

FIELD OF TECHNOLOGY

The following relates to wireless communications, including channel state feedback (CSF) using demodulation reference signals (DMRSs).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Some wireless communications systems may support channel state feedback (CSF) mechanisms in which the network and a UE exchange reference signals (e.g., channel state information reference signals (CSI-RSs)) to facilitate channel estimation used to determine precoders and other parameters that will be used for wireless communications between the network and UE.

SUMMARY

The described techniques relate to improved methods, systems, devices, and apparatuses that support channel state feedback (CSF) using demodulation reference signals (DMRSs). Generally, aspects of the present disclosure support techniques for CSF mechanisms which enable user equipments (UEs) to perform channel estimation using DMRSs. In particular, aspects of the present disclosure enable CSF mechanisms in which DMRSs are transmitted using a default precoder ($P_{Def}$) that is known at the UE to enable efficient channel estimation and enable the UE to recommend precoders to the network. For example, a network entity (e.g., base station) may transmit a DMRS using a default precoder ($P_{Def}$), where a UE may perform channel estimation of a channel (H) between the UE and the network entity using the default precoder. Based on the channel estimation, the UE may determine recommended candidate precoders (e.g., precoders that exhibit sufficient performance), and may transmit an uplink message to the network entity indicating the candidate precoders. The network entity may be configured to acknowledge, indicate, or otherwise activate one of the candidate precoders, where the acknowledged/activated precoder is then used for wireless communications between the network entity and the UE.

A method for wireless communication at a UE is described. The method may include monitoring for a DMRS according to a default precoder, the DMRS associated with CSF information, transmitting an uplink message indicating one or more candidate precoders selected based on the monitoring for the DMRS according to the default precoder, receiving a downlink message indicating a precoder of the one or more candidate precoders based on transmitting the uplink message, and communicating with a network entity in accordance with the indicated precoder of the one or more candidate precoders based on the downlink message.

An apparatus for wireless communication at a UE is described. The apparatus may include a processor, memory coupled with the processor, and instructions stored in the memory. The instructions may be executable by the processor to cause the apparatus to monitor for a DMRS according to a default precoder, the DMRS associated with CSF information, transmit an uplink message indicating one or more candidate precoders selected based on the monitoring for the DMRS according to the default precoder, receive a downlink message indicating a precoder of the one or more candidate precoders based on transmitting the uplink message, and communicate with a network entity in accordance with the indicated precoder of the one or more candidate precoders based on the downlink message.

Another apparatus for wireless communication at a UE is described. The apparatus may include means for monitoring for a DMRS according to a default precoder, the DMRS associated with CSF information, means for transmitting an uplink message indicating one or more candidate precoders selected based on the monitoring for the DMRS according to the default precoder, means for receiving a downlink message indicating a precoder of the one or more candidate precoders based on transmitting the uplink message, and means for communicating with a network entity in accordance with the indicated precoder of the one or more candidate precoders based on the downlink message.

A non-transitory computer-readable medium storing code for wireless communication at a UE is described. The code may include instructions executable by a processor to monitor for a DMRS according to a default precoder, the DMRS associated with CSF information, transmit an uplink message indicating one or more candidate precoders selected based on the monitoring for the DMRS according to the default precoder, receive a downlink message indicating a precoder of the one or more candidate precoders based on transmitting the uplink message, and communicate with a network entity in accordance with the indicated precoder of the one or more candidate precoders based on the downlink message.

Some examples of the method, apparatuses, and non-transitory computer-readable medium described herein may further include operations, features, means, or instructions for performing a channel estimation associated with the CSF information based on the DMRS and the default precoder, where the one or more candidate precoders may be selected based on the channel estimation.

Some examples of the method, apparatuses, and non-transitory computer-readable medium described herein may further include operations, features, means, or instructions for transmitting, via the uplink message, one or more identifiers associated with the one or more candidate precoders and receiving, via the downlink message, an identifier associated with the precoder, the identifier included within the one or more identifiers, where communicating in accordance with the precoder may be based on receiving the identifier.

Some examples of the method, apparatuses, and non-transitory computer-readable medium described herein may further include operations, features, means, or instructions for communicating with the network entity in accordance with the default precoder for at least a portion of a time interval between transmission of the uplink message and reception of the downlink message.

Some examples of the method, apparatuses, and non-transitory computer-readable medium described herein may further include operations, features, means, or instructions for performing a channel estimation associated with the CSF information based on the DMRS and the default precoder, transmitting, via the uplink message, one or more candidate rank indicators, one or more candidate channel quality indicators (CQIs), or both, where the one or more candidate rank indicators, the one or more candidate CQIs, or both, may be determined based on the channel estimation, and receiving, via the downlink message, a rank indicator from the one or more candidate rank indicators, a CQI from the one or more candidate CQIs, or both, where communicating with the network entity may be performed in accordance with the indicated rank indicator, the indicated CQI, or both.

In some examples of the method, apparatuses, and non-transitory computer-readable medium described herein, transmitting the uplink message indicating the one or more candidate precoders may include operations, features, means, or instructions for indicating, via the uplink message, a set of precoder coefficients associated with the precoder of the one or more candidate precoders.

Some examples of the method, apparatuses, and non-transitory computer-readable medium described herein may further include operations, features, means, or instructions for determining the set of precoder coefficients associated with the precoder based on a channel estimation associated with the DMRS.

In some examples of the method, apparatuses, and non-transitory computer-readable medium described herein, the DMRS may be associated with a first time interval and the method, apparatuses, and non-transitory computer-readable medium may include further operations, features, means, or instructions for monitoring for a second DMRS according to the default precoder, the second DMRS associated with a second time interval different from the first time interval, transmitting a second uplink message indicating one or more additional candidate precoders selected based on the monitoring for the second DMRS according to the default precoder, receiving a second downlink message indicating a second precoder of the one or more additional candidate precoders based on transmitting the second uplink message, and communicating in accordance with the second precoder of the one or more additional candidate precoders for at least a portion of the second time interval and based on the second downlink message.

In some examples of the method, apparatuses, and non-transitory computer-readable medium described herein, the DMRS may be associated with a default rank indicator and the method, apparatuses, and non-transitory computer-readable medium may include further operations, features, means, or instructions for performing a channel estimation for the DMRS based on the default rank indicator, the default CQI, or both, where the one or more candidate precoders may be selected based on the channel estimation.

Some examples of the method, apparatuses, and non-transitory computer-readable medium described herein may further include operations, features, means, or instructions for receiving control signaling indicating the default precoder, the default rank indicator, the default CQI, or any combination thereof, where monitoring for the DMRS, performing the channel estimation, or both, may be based on the control signaling.

Some examples of the method, apparatuses, and non-transitory computer-readable medium described herein may further include operations, features, means, or instructions for performing a channel estimation for the DMRS based on the monitoring, where the one or more candidate precoders may be selected from a precoder codebook based on the channel estimation.

In some examples of the method, apparatuses, and non-transitory computer-readable medium described herein, the uplink message may be transmitted via an uplink shared channel.

A method for wireless communication at a network entity is described. The method may include transmitting, to a UE, a DMRS according to a default precoder, the DMRS associated with CSF information, receiving an uplink message indicating one or more candidate precoders selected based on transmitting the DMRS according to the default precoder, transmitting a downlink message indicating a precoder of the one or more candidate precoders based on receiving the uplink message, and communicating with the UE in accordance with the indicated precoder of the one or more candidate precoders based on the downlink message.

An apparatus for wireless communication at a network entity is described. The apparatus may include a processor, memory coupled with the processor, and instructions stored in the memory. The instructions may be executable by the processor to cause the apparatus to transmit, to a UE, a DMRS according to a default precoder, the DMRS associated with CSF information, receive an uplink message indicating one or more candidate precoders selected based on transmitting the DMRS according to the default precoder, transmit a downlink message indicating a precoder of the one or more candidate precoders based on receiving the uplink message, and communicate with the UE in accordance with the indicated precoder of the one or more candidate precoders based on the downlink message.

Another apparatus for wireless communication at a network entity is described. The apparatus may include means for transmitting, to a UE, a DMRS according to a default precoder, the DMRS associated with CSF information, means for receiving an uplink message indicating one or more candidate precoders selected based on transmitting the DMRS according to the default precoder, means for transmitting a downlink message indicating a precoder of the one or more candidate precoders based on receiving the uplink message, and means for communicating with the UE in accordance with the indicated precoder of the one or more candidate precoders based on the downlink message.

A non-transitory computer-readable medium storing code for wireless communication at a network entity is described. The code may include instructions executable by a processor to transmit, to a UE, a DMRS according to a default precoder, the DMRS associated with CSF information, receive an uplink message indicating one or more candidate precoders selected based on transmitting the DMRS according to the default precoder, transmit a downlink message indicating a precoder of the one or more candidate precoders based on receiving the uplink message, and communicate with the UE in accordance with the indicated precoder of the one or more candidate precoders based on the downlink message.

Some examples of the method, apparatuses, and non-transitory computer-readable medium described herein may further include operations, features, means, or instructions for receiving, via the uplink message, one or more identifiers associated with the one or more candidate precoders and transmitting, via the downlink message, an identifier associated with the precoder, the identifier included within the one or more identifiers, where communicating in accordance with the precoder may be based on transmitting the identifier.

Some examples of the method, apparatuses, and non-transitory computer-readable medium described herein may further include operations, features, means, or instructions for communicating with the UE in accordance with the default precoder for at least a portion of a time interval between reception of the uplink message and transmission of the downlink message.

Some examples of the method, apparatuses, and non-transitory computer-readable medium described herein may further include operations, features, means, or instructions for receiving, via the uplink message, one or more candidate rank indicators, one or more candidate CQIs, or both, where the one or more candidate rank indicators, the one or more candidate CQIs, or both, may be based on transmitting the DMRS according to the default precoder and transmitting, via the downlink message, a rank indicator from the one or more candidate rank indicators, a CQI from the one or more candidate CQIs, or both, where communicating with the UE may be performed in accordance with the indicated rank indicator, the indicated CQI, or both.

In some examples of the method, apparatuses, and non-transitory computer-readable medium described herein, the uplink message indicates a set of precoder coefficients associated with the precoder of the one or more candidate precoders.

In some examples of the method, apparatuses, and non-transitory computer-readable medium described herein, the DMRS may be associated with a first time interval and the method, apparatuses, and non-transitory computer-readable medium may include further operations, features, means, or instructions for transmitting a second DMRS according to the default precoder, the second DMRS associated with a second time interval different from the first time interval, receiving a second uplink message indicating one or more additional candidate precoders selected based on transmitting the second DMRS according to the default precoder, transmitting a second downlink message indicating a second precoder of the one or more additional candidate precoders based on receiving the second uplink message, and communicating in accordance with the second precoder of the one or more additional candidate precoders for at least a portion of the second time interval and based on the second downlink message.

Some examples of the method, apparatuses, and non-transitory computer-readable medium described herein may further include operations, features, means, or instructions for transmitting control signaling indicating a default precoder, a default rank indicator, a default CQI, or any combination thereof, where transmitting the DMRS, receiving the uplink message, or both, may be based on the control signaling.

In some examples of the method, apparatuses, and non-transitory computer-readable medium described herein, the one or more candidate precoders may be selected from a precoder codebook based on transmitting the DMRS according to the default precoder.

In some examples of the method, apparatuses, and non-transitory computer-readable medium described herein, the uplink message may be received via an uplink shared channel.

DETAILED DESCRIPTION

Figure 1:
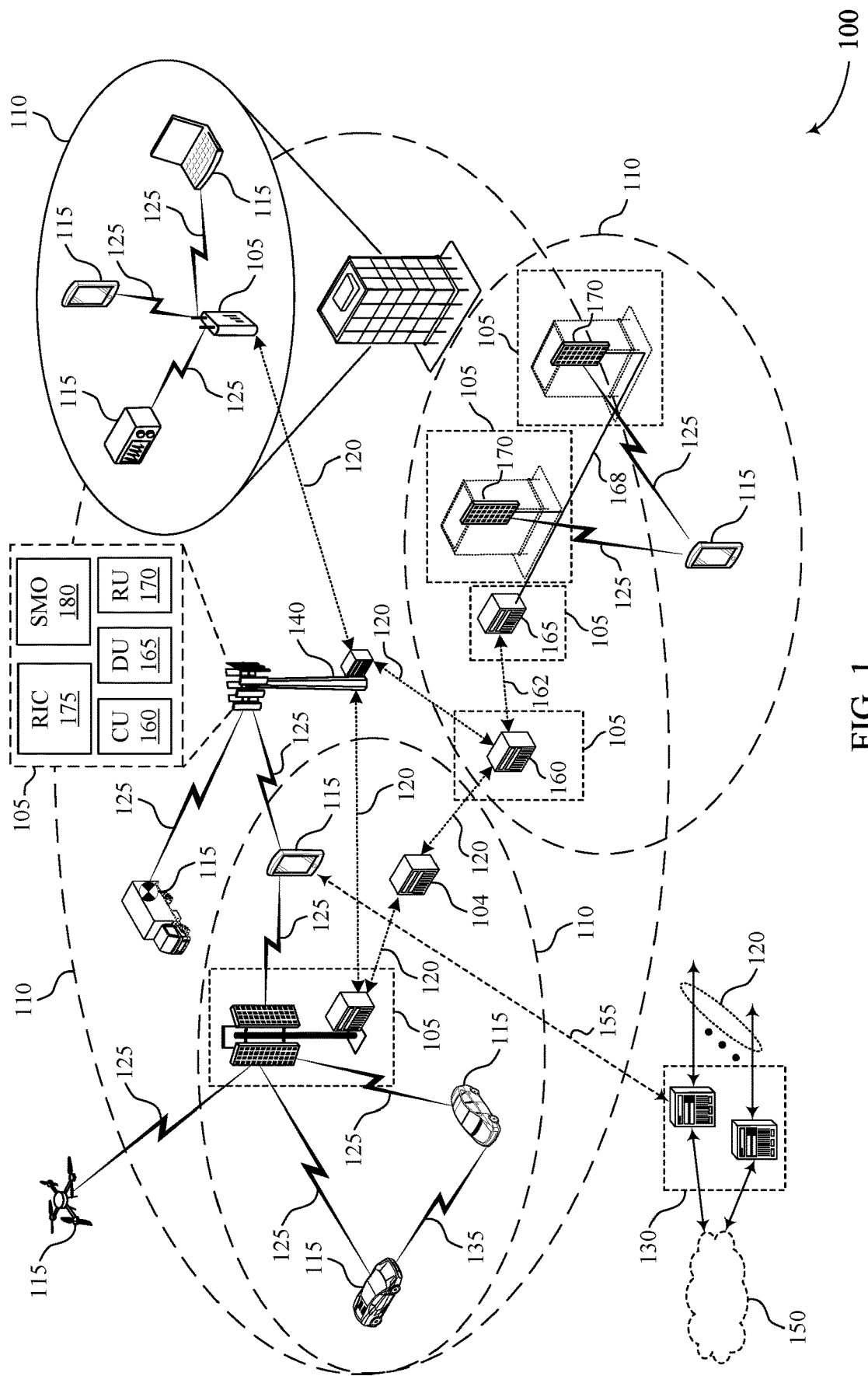
FIG. 1 illustrates an example of a wireless communications system that supports channel state feedback (CSF) using demodulation reference signals (DMRSs) in accordance with one or more aspects of the present disclosure.

Some wireless communications systems may support channel state feedback (CSF) mechanisms in which the network and a user equipment (UE) exchange reference signals (e.g., channel state information reference signals (CSI-RSs)) to facilitate channel estimation used to determine precoders and other parameters that will be used for wireless communications between the network and UE. For example, a network entity, such as one or more components of a base station, may transmit a CSI-RS with a precoder (P), and the UE may perform channel estimation for the channel (H) between the network entity and the UE by measuring an estimation of H*P. The channel estimation for H*P may then be used to determine which precoder should be used for communications between the UE and the network entity.

However, as the frequency of wireless communications increases, antenna panels at wireless devices (e.g., UEs, network entities) include larger quantities and densities of transmit (Tx) and receive (Rx) antenna elements. Such increases in quantities of antenna elements per antenna array results in corresponding increases in CSI-RS overhead used for CSF (e.g., more CSI-RSs), thereby increasing traffic and control overhead. Moreover, antenna arrays with large quantities of antenna elements may transmit CSI-RSs in accordance with an interleaving pattern across the respective antenna elements. Such interleaving pattern may result in infrequent channel measurements for each respective antenna element (e.g., low frequency domain density), thereby reducing the frequency of channel measurements and accuracy of CSF mechanisms.

Accordingly, aspects of the present disclosure are directed to techniques for CSF mechanisms which enable UEs to perform channel estimation using demodulation reference signals (DMRSs). In particular, aspects of the present disclosure enable CSF mechanisms in which DMRSs are transmitted using a default precoder ($P_{Def}$) that is known at the UE to enable efficient channel estimation and enable the UE to recommend precoders to the network. For example, a network entity (e.g., base station) may transmit a DMRS using a default precoder ($P_{Def}$), where a UE may perform channel estimation of a channel (H) between the UE and the network entity using the default precoder. Based on the channel estimation, the UE may determine candidate precoders (e.g., precoders that exhibit sufficient performance), and may transmit an uplink message to the network entity indicating (e.g., recommending) the candidate precoders. The network entity may be configured to acknowledge, indicate, or otherwise activate one of the candidate precoders, where the acknowledged/activated precoder is then used for wireless communications between the network entity and the UE.

In some implementations, the UE may calculate precoding coefficients associated with candidate/recommended precoders, and may indicate candidate precoders to the network entity by indicating the calculated precoding coefficients. In other cases, the UE may select candidate precoders from a precoder codebook including a set of defined precoders, and may indicate the selected candidate precoders to the network entity via precoder identifiers (IDs).

Aspects of the disclosure are initially described in the context of wireless communications systems. Additional aspects of the disclosure are described in the context of an example process flow. Aspects of the disclosure are further illustrated by and described with reference to apparatus diagrams, system diagrams, and flowcharts that relate to CSF using DMRSs.

FIG. 1 illustrates an example of a wireless communications system 100 that supports CSF using DMRSs in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally, or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support CSF using DMRSs as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

In some aspects, the UEs 115 and the network entities 105 (e.g., base stations) of the wireless communications system 100 may support techniques for CSF mechanisms which enable UEs 115 to perform channel estimation using DMRSs. In particular, the wireless communications system 100 may support CSF mechanisms in which DMRSs are transmitted using a default precoder ($P_{Def}$) that is known at the UE 115 to enable efficient channel estimation and enable the UE 115 to recommend precoders to the network.

For example, a network entity 105 (e.g., base station) of the wireless communications system 100 may transmit a DMRS using a default precoder ($P_{Def}$), where a UE 115 may perform channel estimation of a channel (H) between the UE 115 and the network entity 105 using the default precoder. Based on the channel estimation, the UE 115 may determine candidate precoders (e.g., precoders that exhibit sufficient performance), and may transmit an uplink message to the network entity 105 indicating the candidate precoders. The network entity 105 may be configured to acknowledge, indicate, or otherwise activate one of the candidate precoders, where the acknowledged/activated precoder is then used for wireless communications between the network entity 105 and the UE 115.

In some implementations, the UE may calculate precoding coefficients associated with candidate/recommended precoders, and may indicate candidate precoders to the network entity by indicating the calculated precoding coefficients. In other cases, the UE may select candidate precoders from a precoder codebook including a set of defined precoders, and may indicate the selected candidate precoders to the network entity via precoder identifiers (IDs). Moreover, in some implementations, CSF mechanisms described herein may be performed periodically (e.g., every x slots) in order to select precoders that will be used between the UE 115 and the network entity 105 for respective time intervals.

Techniques described herein may enable CSF mechanisms to be performed using DMRSs, as opposed to CSI-RSs used by some wireless communications systems. By enabling CSF procedures and mechanisms to be performed using DMRSs, techniques described herein may reduce a quantity of reference signals that are communicated to perform precoder selection, thereby reducing control signaling overhead and network congestion. Moreover, by enabling CSF and precoder selection to be performed using DMRSs, techniques described herein may improve an efficiency of CSF mechanisms for wireless devices including higher quantities and densities of antenna elements per antenna array, thereby enabling CSF in the context of higher-frequency communications.

Figure 2:
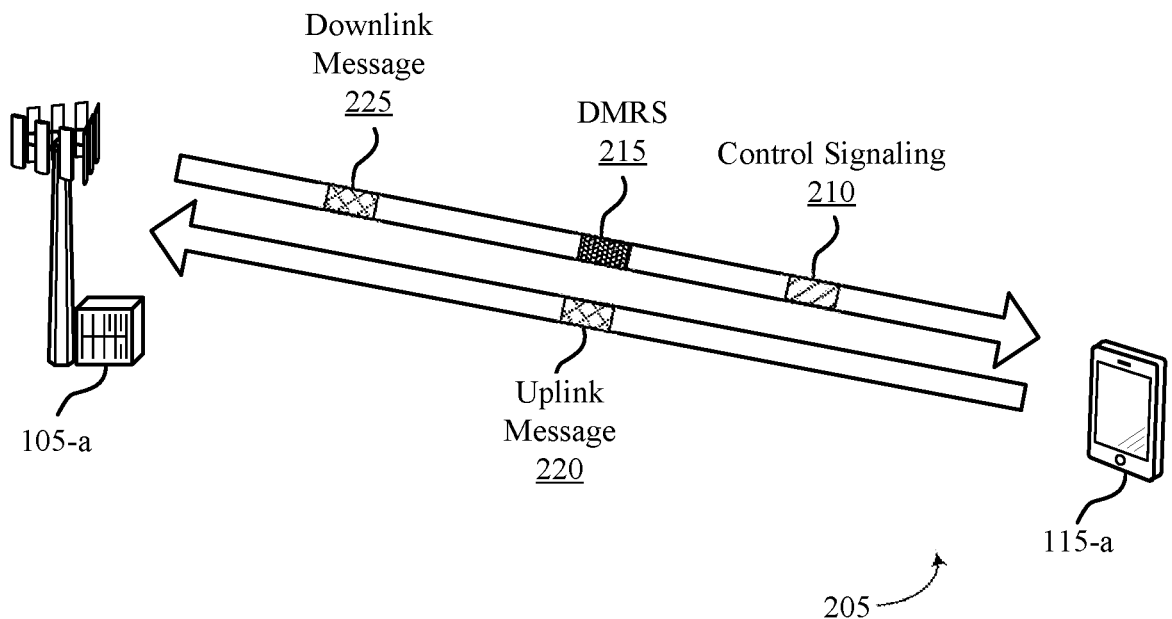
FIG. 2 illustrates an example of a wireless communications system that supports CSF using DMRSs in accordance with one or more aspects of the present disclosure.
Figure 2:
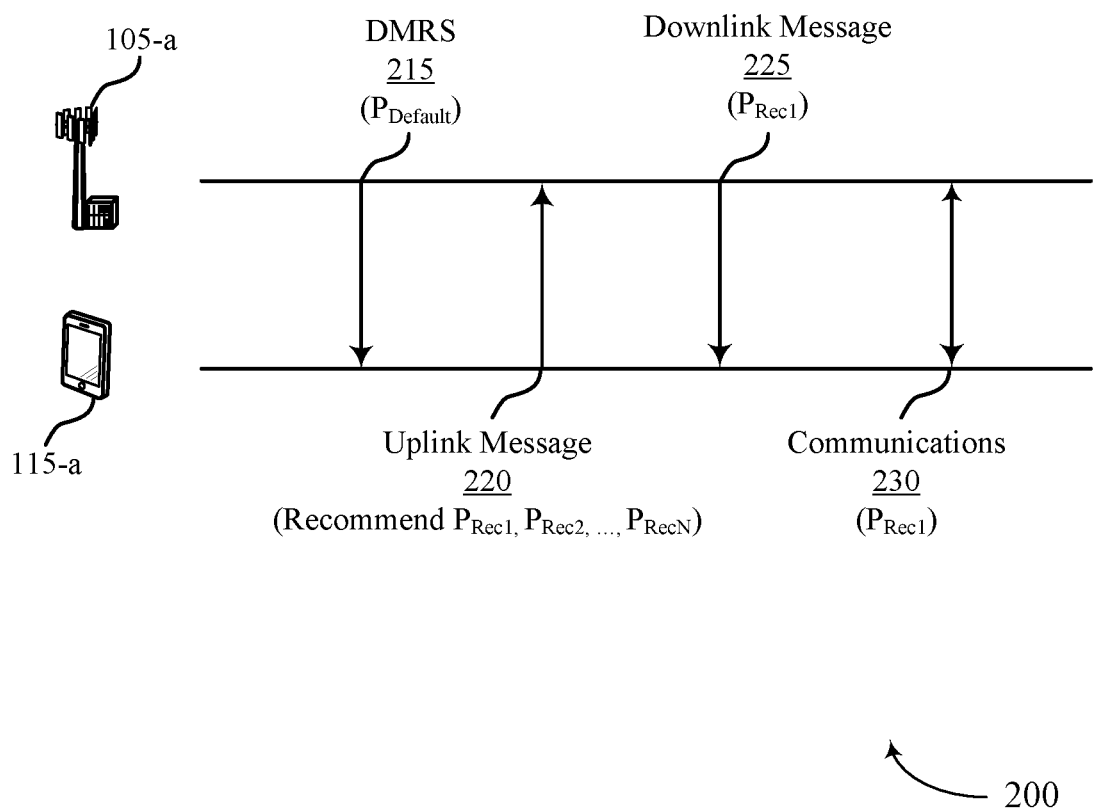

FIG. 2 illustrates an example of a wireless communications system 200 that supports CSF using DMRSs in accordance with one or more aspects of the present disclosure. In some examples, wireless communications system 200 may implement, or be implemented by, aspects of wireless communications system 100. In particular, wireless communications system 200 may support CSF mechanisms and precoder selection using DMRSs, as described herein.

The wireless communications system 200 may include a network entity 105-a (e.g., base station) and a UE 115-a, which may be examples of network entities 105, UEs 115, and other wireless as described with reference to FIG. 1. The UE 115-a may communicate with the network entity 105-a using a communication link 205, which may be an example of an NR or LTE link between the UE 115-a and the network entity 105-a. In some cases, the communication link 205 between the UE 115-a and the network entity 105-a may include an example of an access link (e.g., Uu link) which may include a bi-directional link that enables both uplink and downlink communication. For example, the UE 115-a may transmit uplink signals, such as uplink control signals or uplink data signals, to the network entity 105-a using the communication link 205, and the network entity 105-a may transmit downlink signals, such as downlink control signals or downlink data signals, to the UE 115-a using the communication link 205.

As noted previously herein, some wireless communications systems may support CSF mechanisms in which the network and a UE 115 exchange reference signals CSI-RSs to facilitate channel estimation used to determine precoders and other parameters that will be used for wireless communications between the network and UE 115. For example, a base station may transmit a CSI-RS with a precoder (P), and the UE 115 may perform channel estimation for the channel (H) between the base station and the UE 115 by measuring an estimation of H*P. The channel estimation for H*P may then be used to determine which precoder should be used for communications between the UE 115 and the base station.

However, as the frequency of wireless communications increases moving to 5G and Sixth Generation (6G), and beyond, antenna panels at wireless devices (e.g., UEs 115, base stations) include larger quantities and densities of Tx and Rx antenna elements. Some wireless devices may include large-scale MIMO configurations with hundreds of antennas. These increases in quantities of antenna elements per antenna array results in corresponding increases in CSI-RS overhead used for CSF (e.g., more CSI-RSs) in order to measure large quantities of ports, thereby increasing traffic and control overhead.

Further, CSI-RSs may be expected to exhibit sufficient frequency domain density of the channel to enable CSF. As such, antenna arrays with large quantities of antenna elements may transmit CSI-RSs in accordance with an interleaving pattern across the respective antenna elements. For example, assuming an antenna array with 256 Tx antenna elements ($N_{Tx}=256$), transmit antennas of the antenna array may utilize an interleaving pattern utilizing resource elements as follows:

$Tx$ antenna $1\ ((Tx_1) \rightarrow 1{:}256{:}\text{end of bandwidth}$
$Tx$ antenna $2\ ((Tx_2) \rightarrow 2{:}256{:}\text{end of bandwidth}$
$\vdots$
$Tx$ antenna $256\ ((Tx_{256}) \rightarrow 256{:}256{:}\text{end of bandwidth}$ This sparse interleaving pattern illustrated above may result in poor frequency domain density and infrequent channel measurements for each respective antenna element. In particular, the interleaving pattern illustrated above may result in the channel ($H_i(f)$) between the UE 115 and the base station being measured only once every 256 resource elements. As such, the interleaving pattern may reduce the frequency of channel measurements, and thereby reduce the accuracy and reliability of CSF mechanisms.

In order to address the shortcomings of the CSI-RS interleaving patterns, some wireless communications have attempted to configure multiple CSI-RS symbols in a slot. Such techniques may improve CSI-RS frequency domain density, but at the expense of increased signaling overhead. For instance, using four CSI-RS symbols per slot may enable a channel to be measured every 64 resource elements (256/4=64), as compared to channel measurements performed every 256 resource elements described above. However, such techniques may incur enormous signaling overhead, which may be ill-suited for some applications and wireless communications systems.

Accordingly, aspects of the present disclosure are directed to techniques for CSF mechanisms which enable UEs 115 to perform channel estimation using DMRSs. Aspects of the present disclosure may address multiple issues associated with conventional CSF techniques described above. Namely, the CSF mechanisms described herein may reduce control signaling overhead in the context of large MIMO antenna arrays (e.g., reduce signaling overhead compared to CSI-RS based CSF mechanisms), and significantly improve frequency domain density of the measured channel ($H_i(f)$) for CSF.

In particular, aspects of the present disclosure enable CSF mechanisms in which DMRSs are transmitted using a default precoder ($P_{Def}$) that is known at the UE to enable efficient channel estimation and enable the UE to recommend precoders to the network. According to techniques described herein, a UE 115 and a network entity 105 may inform one another of a used/recommended (e.g., default, pre-configured) downlink precoder, rank, MCS, and the like. Subsequently, using the default parameters, the UE 115 may be able to perform estimation of the physical channel H. As such, channel estimation techniques based on DMRS described herein may enable UEs 115 to fully estimate the channel H, as compared to some conventional techniques which rely on an estimation of H*P.

The CSF and channel estimation mechanisms described herein may be associated with several attendant advantages compared to other CSF mechanisms. One advantage arising from the receiver architecture and CSF mechanisms described herein is that the receiver device (e.g., UE 115) may be able to perform non-linearity correction, such as digital post distortion (DPOD). Cancelling the non-linearity may enable techniques described herein to be implemented in the context of higher order modulations (e.g., more than 256QAM).

For example, due to the fact that non-linearity occurs between the precoder P and the channel H, DPOD correction may require knowledge of both the channel H and the precoder P separately and independently. As such, without knowledge of the precoder, some conventional channel estimation techniques only provide an estimation of H*P. In the context of a square precoder (non-practical case) in which the number of Tx antennas equals the number of layers, the estimation of channel H can be retrieved by multiplying (H*P) by the pseudo-inverse of the precoder, $P^{-1}$ (e.g., $P^{-1}*(H*P)$). However, pseudo-inverse of the precoder P does not exist for a non-square precoder, such as in the context of a few layers precoded to hundreds of antennas. Accordingly, the channel H may have to be estimated differently. Further, in both cases (e.g., square precoder, non-square precoder), the knowledge of the precoder P is required in order to preform estimation of the physical channel (H without precoder) and apply non-linearity cancelation at the receiver.

To address these issues, techniques described herein may enable CSF mechanisms in which DMRSs are transmitted using a default precoder ($P_{Def}$) that is known at the UE 115 to enable efficient channel estimation and enable the UE 115 to recommend precoders to the network. For example, a network entity (e.g., base station) may transmit a DMRS using a default precoder ($P_{Def}$), where a UE may perform channel estimation of a channel (H) between the UE and the network entity using the default precoder. Based on the channel estimation, the UE may determine candidate precoders (e.g., precoders that exhibit sufficient performance), and may transmit an uplink message to the network entity indicating (e.g., recommending) the candidate precoders. The network entity may be configured to acknowledge, indicate, or otherwise activate one of the candidate precoders, where the acknowledged/activated precoder is then used for wireless communications between the network entity and the UE.

In cases where the precoder P is known at the UE 115-a (such as in the context of a default precoder $P_{Def}$, the physical channel H between the UE 115-a and the network entity 105-a can be estimated. The signal obtained/received at the $r^{th}$ receiver (e.g., $r^{th}$ Rx antenna element at the UE 115-a) can be modelled as a composition of Tx signals going through MIMO channel, as defined in Equation 1 below:

$$x_r = \begin{pmatrix} x_r(k_1) \\ \vdots \\ x_r(k_K) \end{pmatrix} = \begin{pmatrix} \sum_{t=1}^{T} H_{r,t}(k_1)\Delta_t(k_1) \\ \vdots \\ \sum_{t=1}^{T} H_{r,t}(k_K)\Delta_t(k_K) \end{pmatrix} \quad (1)$$

where $k_i (0 \leq i \leq K)$ is the set of frequency indexes, and $H_{r,t}(k_i)$ is the channel coefficient from the $t^{th}$ Tx antenna element to the $r^{th}$ Rx antenna element at the $k_i$ frequency.

Expanding upon Equation 1 above yields Equations 2-4 below:

$$(\underline{\Delta}_1 \cdots \underline{\Delta}_T) = (\underline{D}_1 \cdots \underline{D}_s) \begin{pmatrix} \underline{P}_{1,1} & \cdots & \underline{P}_{1,T} \\ \vdots & \ddots & \vdots \\ \underline{P}_{S,1} & \cdots & \underline{P}_{S,T} \end{pmatrix} \quad (2)$$

$$\underline{D}_s \equiv \begin{pmatrix} D_s(k_1) & 0 & \cdot \\ 0 & \ddots & 0 \\ \cdot & 0 & D_s(k_K) \end{pmatrix} \quad (3)$$

$$\underline{P}_{s,t} \equiv \begin{pmatrix} P_{s,t}(k_1) & 0 & \cdot \\ 0 & \ddots & 0 \\ \cdot & 0 & P_{s,t}(k_K) \end{pmatrix} \quad (4)$$

where $P_{s,t}(k_i)$ is the precoding matrix entry from the $s^{th}$ stream to the $t^{th}$ Tx antenna element at the $k_i$ frequency, and $D_s(k_i)$ is the data stream at the $k_i$ frequency.

Further manipulation for channel estimation yields Equations 5 and 6 below:

$$X_r = \sum_{t=1}^{T} \begin{pmatrix} \Delta_t(k_1) & 0 & \ddots \\ 0 & \ddots & 0 \\ \ddots & 0 & \Delta_t(k_K) \end{pmatrix} \begin{pmatrix} H_{r,t}(k_1) \\ \vdots \\ H_{r,t}(k_K) \end{pmatrix} \equiv \sum_{t=1}^{T} \underline{\Delta}_t \underline{H}_{r,t} \quad (5)$$

$$\sum_{t=1}^{T} \underline{\Delta}_t \underline{H}_{r,t} = \quad (6)$$

$$(\underline{\Delta}_1 \cdots \underline{\Delta}_T) \begin{pmatrix} \underline{H}_{r,1} \\ \vdots \\ \underline{H}_{r,T} \end{pmatrix} \equiv (\underline{D}_1 \cdots \underline{D}_s) \begin{pmatrix} \underline{P}_{1,1} & \cdots & \underline{P}_{1,T} \\ \vdots & \ddots & \vdots \\ \underline{P}_{S,1} & \cdots & \underline{P}_{S,T} \end{pmatrix} \begin{pmatrix} \underline{H}_{r,1} \\ \vdots \\ \underline{H}_{r,T} \end{pmatrix} = \mathcal{DPH}_r$$

Accordingly, with additive noise, the signal received at the Rx device (e.g., UE 115-a) may be characterized according to Equations 7 and 8 below:

$$\mathcal{Y}_r = \mathcal{DPH}_r + N_r (1 \leq r \leq R) \quad (7)$$

$$N_r \equiv \begin{pmatrix} N_r(k_1) \\ \vdots \\ N_r(k_K) \end{pmatrix} \quad (8)$$

The channel estimation illustrated in Equations 7 and 8 above may be solved to attain the estimated physical channel $\widehat{\mathcal{H}}_r$ according to Equation 9 below:

$$\widehat{\mathcal{H}}_r = \text{function}(\mathcal{D}, \mathcal{P}, \mathcal{Y}_r) \quad (9)$$

According to CSF techniques described herein, the UE 115-a may know which downlink precoder (e.g., default precoder ($P_{Def}$)) will be used by the network entity 105-a to transmit DMRSs, and may therefore estimate the physical channel H directly from received DMRSs based on (e.g., in accordance with) the known precoder. The UE 115-a may be configured to calculate and optimize CSF parameters (e.g., precoding matrix indicators (PMIs), rank indicators, CQIs) based on the physical channel estimation. In particular, the UE 115-a may perform the channel estimation to determine candidate/recommended CSF parameters such that the determined CSF parameters are matched to the downlink channel and to time domain variations across the downlink channel.

An example may prove to be illustrative. Referring to the wireless communications system 200 illustrated in FIG. 2, the UE 115-a may receive control signaling 210 from the network entity 105-a. The control signaling may include, but is not limited to, RRC signaling, synchronization signal block (SSB) messaging, and the like. In some aspects, the control signaling 210 may indicate one or more "default" parameters for performing CSF procedures. Default parameters may include, but are not limited to, a default precoder ($P_{Default}$), a default rank indicator (Rank=$RI_{Default}$) a default CQI (e.g., MCS=$CQI_{Default}$), or any combination thereof. In other words, the network entity 105-a may instruct the UE 115-a to perform initial communications using known parameters (e.g., parameters that are known or configured at both the network entity 105-a and the UE 115-a).

The UE 115-a may monitor for DMRSs 215 that are transmitted or broadcast by the network entity 105-a. In particular, the UE 115-a may monitor for DMRSs 215 associated with CSF information between the UE 115-a and the network entity 105-a. In other words, the UE 115-a may monitor for DMRSs 215 in order to preform CSF with the network entity 105-a. In some aspects, the UE 115-a may monitor for DMRSs 215 based on receiving the control signaling 210. For example, the UE 115-a may monitor for DMRSs 215 in accordance with the parameters (e.g., default parameters) indicated via the control signaling 210. For instance, the UE 115-a may monitor for DMRSs 215 using (e.g., in accordance with) the default precoder ($P_{Default}$), the default rank indicator (Rank=$RI_{Default}$), the default CQI (e.g., MCS=$CQI_{Default}$), or any combination thereof.

The UE 115-a may receive, from the network entity 105-a, a DMRS 215 associated with CSF information between the respective devices. The UE 115-a may receive, and the network entity 105-a may transmit, the DMRS 215 based on receiving/transmitting the control signaling 210, monitoring for the DMRS 215, or both. For example, as shown in FIG. 2, the network entity 105-a may transmit (and the UE 115-a may receive) the DMRS 215 in accordance with the default precoder ($P_{Default}$), the default rank indicator ($RI_{Default}$), the default CQI ($CQI_{Default}$), or any combination thereof. The default precoder may include an a-priori agreed default precoder. The default precoder may not necessarily be associated with a given channel. In other words, the default precoder may include a non-optimal precoder for the channel. Further, as described herein, the network entity 105-a may transmit the DMRS 215 using other default parameters, such as default rank indicator ($RI_{Default}$), and the default CQI ($CQI_{Default}$) which may not be fixed a-priori.

In some aspects, the UE 115-a may perform a channel estimation for a channel between the UE 115-a and the network entity 105-a based on the DMRS 215. The UE 115-a may perform the channel estimation to identify an optimal CSF or PMIs (e.g., optimal precoder, SVD precoder, rank indicator, CQI) that will be used for wireless communications between the UE 115-a and the network entity 105-a. Stated differently, the UE 115-a may perform the channel estimation in order to identify candidate or precoders that the UE 115-a will recommend or suggest to the network entity 105-a for subsequent communications between the respective devices, where the recommended candidate precoders and other communications parameters are matched/optimized to the channel. In some implementations, the UE 115-a may perform channel estimation to identify recommended precoders and other parameters per precoder resource group (PRG).

In some cases, the network entity 105-a may transmit the DMRS 215 prior to (or within) a first slot of a time interval (e.g., first slot of a burst including a set of slots). In such cases, the DMRS 215 may include CSF information which enables the UE 115-a and the network entity 105-a to determine communication parameters (e.g., precoder, rank indicator, CQI) that will be used for wireless communications within the time interval or burst.

The UE 115-a may perform the channel estimation associated with the CSF information of the DMRS 215 based on (e.g., using) the default precoder ($P_{Default}$). In particular, the UE 115-a may perform the channel estimation based on (e.g., using, in accordance with) the default parameter(s) indicated via the control signaling 210. For example, the UE 115-a may perform the channel estimation in accordance with the default precoder, the default rank indicator, the default CQI (e.g., default MCS), or any combination thereof.

In some implementations, the UE 115-a may determine one or more candidate (e.g., recommended) precoders for wireless communications between the UE 115-a and the network entity 105-a. In other words, the UE 115-a may identify one or more precoders which exhibit sufficient performance, or which exhibit a performance that is greater than some threshold. The UE 115-a may determine the one or more candidate precoders based on receiving the control signaling 210, monitoring for DMRS 215, receiving the DMRS 215, performing the channel estimation, or any combination thereof. For example, the UE 115-a may determine the one or more candidate/recommended precoders (e.g., $P_{Rec1}$, $P_{Rec2}$, . . . , $P_{RecN}$) based on one or more measurements that were performed for the channel estimation.

In some implementations, the UE 115-a may determine the candidate precoder(s) ($P_{Rec1}$, $P_{Rec2}$, . . . , $P_{RecN}$) by determining or calculating one or more precoder coefficients associated with the respective candidate precoder. For example, the UE 115-a may calculate one or more precoder coefficients for a first candidate precoder $P_{Rec1}$ based on the channel estimation. In this example, the first candidate precoder $P_{Rec1}$ may include or be determined according to the one or more precoder coefficients. Selecting or calculating precoder coefficients may be an example of non-codebook-based precoder selection. Such non-codebook based precoder selection techniques may result in improved capacity, as the precoder selection may not be limited to a finite-sized precoder codebook. In particular, by calculating precoder coefficients, the UE 115-a may recommend use of a singular value decomposition (SVD) precoder which results in optimal capacity and performance, and which enables non-linearity correction in the receiver (e.g., DPOD).

Additionally, or alternatively, the UE 115-a may select the one or more candidate precoder coefficients from a codebook of precoders (e.g., codebook-based precoder selection). For example, in some implementations, the control signaling 210 may indicate a codebook of precoders that may be used for wireless communications between the respective devices, where each precoder within the codebook corresponds to a precoder identifier (ID). In this example, the UE 115-a may select one or more precoders from the codebook as candidate precoders based on the channel estimation performed on the DMRS 215.

In some implementations, the UE 115-a may determine other parameters for wireless communications between the UE 115-a and the network entity 105-a (e.g., other candidate or recommended parameters), such as candidate rank indicators, candidate CQIs, and the like. Additional candidate parameters may be determined based on the channel estimation. As noted previously, the UE 115-a may determine candidate precoders, rank indicators, and CQIs per PRG.

The UE 115-a may transmit, to the network entity 105-a, an uplink message 220 indicating the one or more candidate precoders (e.g., recommended precoders). In other words, the UE 115-a may transmit an uplink message 220 suggesting or recommending the candidate precoders. For example, as shown in FIG. 2, the UE 115-a may transmit the uplink message 220 indicating the candidate precoders $P_{Rec1}$, $P_{Rec2}$, . . . , $P_{RecN}$ that it recommends for wireless communications between the respective devices. The UE 115-a may transmit the uplink message 220 based on receiving the control signaling 210, monitoring for the DMRS 215, receiving the DMRS 215, performing the channel estimation, determining the candidate precoders, or any combination thereof.

The uplink control message may indicate the candidate precoders as precoders which may (or should) be used for subsequent communications between the UE 115-*a* and the network entity 105-*a*. For example, in cases where the UE 115-*a* determines/calculates precoder coefficients for the candidate precoders, the uplink message 220 may indicate the precoder coefficients for the respective candidate precoders. In this example, the precoder coefficients may be quantized, compressed, or both, as coded data via PUSCH in a subsequent slot. By way of another example, in cases where the UE 115-*a* selects the candidate precoders from a codebook of precoders, the uplink message 220 may indicate precoder IDs corresponding to the selected candidate precoders.

In some aspects, the UE 115-*a* may transmit the uplink message 220 via an uplink shared channel (e.g., PUSCH), an uplink control channel (e.g., PUCCH), or both. The uplink message 220 may include an uplink control information (UCI) message, a MAC-CE message, and the like. The channel used to transmit the uplink message 220 may depend on how the UE 115-*a* indicates the candidate precoders. For example, in cases where the uplink message 220 indicates precoding coefficients for the candidate precoders, the payload of the uplink message 220 may be relatively large. Accordingly, in such cases, the uplink message 220 may be transmitted via an uplink shared channel. Comparatively, in cases where the uplink message 220 indicates precoder IDs for the candidate precoders, the payload may be relatively small, and the uplink message 220 may be transmitted via an uplink control channel.

In additional or alternative implementations, the UE 115-*a* may indicate other candidate parameters for wireless communications between the UE 115-*a* and the network entity 105-*a*. For example, the uplink message 220 may indicate one or more candidate rank indicators, candidate CQIs, and the like. In this regard, the UE 115-*a* may recommend or suggest other parameters that will be used for subsequent communications between the respective devices.

In some aspects, the network entity 105-*a* may determine which precoder and other parameters will be used for wireless communications with the UE 115-*a*. In particular, the network entity 105-*a* may determine a precoder and other parameters that will be used to improve (e.g., optimize) performance and capacity of communications between the respective devices. When selecting communications parameters, the network entity 105-*a* may consider and take into account (e.g., prioritize) candidate precoders and other candidate parameters that were recommended/suggested by the UE 115-*a*.

In some aspects, the UE 115-*a* may receive, from the network entity 105-*a*, a downlink message 225 indicating a precoder of the one or more candidate precoders which were indicated via the uplink message 220. In other words, the downlink message 225 (e.g., downlink control information (DCI) message, MAC-CE) may indicate, activate, or otherwise acknowledge one of the candidate precoders that was suggested/recommended by the UE 115-*a* via the uplink message 220. For example, as shown in FIG. 2, the uplink message 220 may indicate multiple precoder IDs corresponding to multiple recommended precoders $P_{Rec1}$, $P_{Rec2}$, . . . , $P_{RecN}$, where the downlink message 225 indicates a precoder ID corresponding to the first candidate precoder $P_{Rec1}$ that will be used for subsequent communications 230. In some aspects, the downlink message 225 may indicate that the network entity 105-*a* intends to adopt the recommendation of the UE 115-*a* associated with which precoder should be used (e.g., adopt the recommendation for the first candidate precoder $P_{Rec1}$). Additionally, or alternatively, the downlink message 225 may indicate that the network entity 105-*a* will not adopt the candidate precoders recommended by the UE 115-*a*, and may instead indicate a different precoder (e.g., precoder ID) that was not recommended by the UE 115-*a*.

In additional or alternative implementations, the network entity 105-*a* may indicate, activate, or otherwise acknowledge other candidate/recommended parameters for wireless communications between the UE 115-*a*. For example, the uplink message 220 may indicate one or more candidate rank indicators, candidate CQIs, and the like. In this example, the downlink message 225 may indicate one of the candidate rank indicators, candidate CQIs, or both, that will be used for subsequent communications between the respective devices.

In some aspects, the downlink message 225 may indicate a time or slot number (e.g., slot indicator, slot index) at which the network entity 105-*a* plans to adopt or otherwise activate the indicated precoder or other parameters. For example, the downlink message 225 may indicate that the first candidate precoder $P_{Rec1}$ will be activated two slots following transmission/reception of the downlink message 225 (e.g., two-slot time offset). In such cases, the UE 115-*a* and the network entity 105-*a* may perform communications within the time offset according to the default precoder $P_{Default}$, and may activate the first candidate precoder $P_{Rec1}$ upon an expiration of the time offset. In this example, the UE 115-*a* and the network entity 105-*a* may perform subsequent communications 230 according to the default precoder $P_{Default}$ (e.g., following the expiration of the time offset and activation of $P_{Rec1}$).

The UE 115-*a* and the network entity 105-*a* may communicate with one another based on (e.g., using, in accordance with) the indicated precoder. That is, the UE 115-*a* and the network entity 105-*a* may communicate with one another using the precoder that was indicated, activated, or otherwise acknowledged via the downlink message 225. For example, as shown in FIG. 2, the UE 115-*a* and the network entity 105-*a* may perform communications 230 (e.g., uplink signals, downlink signals) with one another using the first candidate precoder $P_{Rec1}$ that was recommended via the uplink message 220 and indicated via the downlink message 225. Moreover, the UE 115-*a* and the network entity 105-*a* may perform the communications 230 with another in using other parameters which were indicated/acknowledged via the downlink message 225, including an indicated rank indicator, an indicated CQI, or both. In this regard, the UE 115-*a* and the network entity 105-*a* may communicate with one another based on transmitting/receiving the uplink message 220 and the downlink message 225.

In some implementations, the UE 115-*a* and the network entity 105-*a* may perform the signaling illustrated in FIG. 2 periodically or at set intervals in order to determine communication parameters (e.g., precoder, rank indicator, CQI) that will be used for wireless communications 230 throughout a certain time period. For example, the CSF procedure illustrated in FIG. 2 may be performed at the beginning of each "burst," where each burst includes some quantity of slots or other TTIs (e.g., burst=dozens or hundreds of slots). In such cases, the signaling for the CSF procedure illustrated in FIG. 2 may be used to determine communication parameters (e.g., precoder, rank indicator, CQI) that will be used for wireless communications throughout each respective burst, where the recommended and indicated/acknowledged precoder is used until the end of the respective burst. This concept will be further shown and described with respect to FIG. 3.

Techniques described herein may enable CSF mechanisms to be performed using DMRSs 215, as opposed to CSI-RSs used by some wireless communications systems. By enabling CSF procedures and mechanisms to be performed using DMRSs 215, techniques described herein may reduce a quantity of reference signals that are communicated to perform precoder selection, thereby reducing control signaling 210 overhead and network congestion. Moreover, by enabling CSF and precoder selection to be performed using DMRSs 215, techniques described herein may improve an efficiency of CSF mechanisms for wireless devices including higher quantities and densities of antenna elements per antenna array, thereby enabling CSF in the context of higher-frequency communications.

Figure 3:
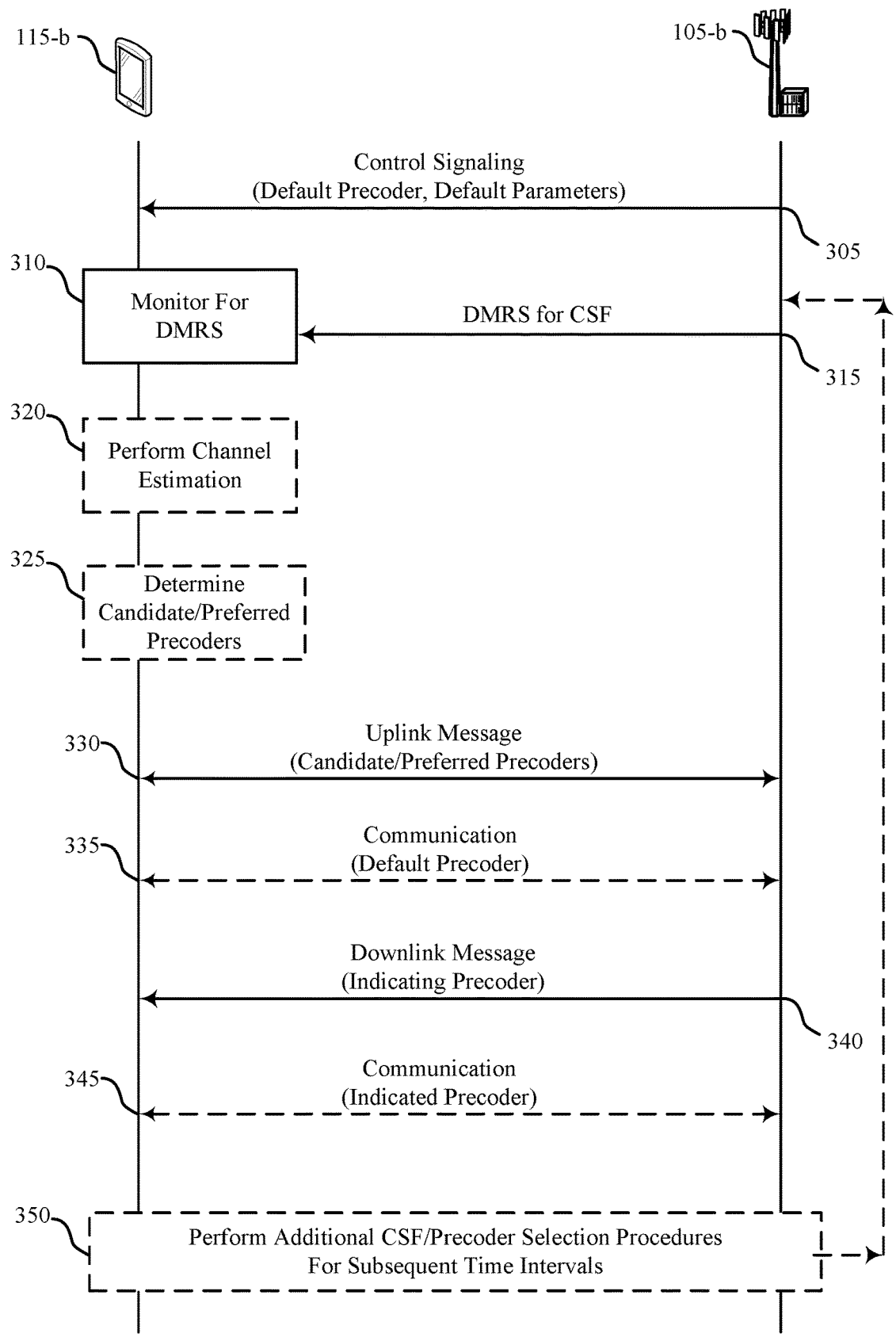
FIG. 3 illustrates an example of a process flow that supports CSF using DMRSs in accordance with one or more aspects of the present disclosure.

FIG. 3 illustrates an example of a process flow 300 that supports CSF using DMRSs in accordance with one or more aspects of the present disclosure. In some examples, process flow 300 may implement, or be implemented by, aspects of wireless communications system 100, wireless communications system 200, or both. In particular, the process flow 300 illustrates a CSF procedure performed between a UE 115-*b* and a network entity 105-*b*. For example, the process flow 300 illustrates a UE 115-*b* receiving a DMRS from a network entity 105-*b* for CSF, performing measurements on the received DMRS, transmitting an indication of recommended or candidate precoders, receiving an acknowledgement or indication of one of the candidate precoders, and communicating with the network entity 105-*b* in accordance with the indicated precoder, as described with reference to FIGS. 1 and 2.

In some cases, process flow 300 may include a UE 115-*b* and a network entity 105-*b*, which may be examples of corresponding devices as described herein. In particular, the UE 115-*b* and the network entity 105-*b* illustrated in FIG. 3 may include examples of the UE 115-*a* and the network entity 105-*a*, respectively, as illustrated in FIG. 2.

In some examples, the operations illustrated in process flow 300 may be performed by hardware (e.g., including circuitry, processing blocks, logic components, and other components), code (e.g., software) executed by a processor, or any combination thereof. Alternative examples of the following may be implemented, where some steps are performed in a different order than described or are not performed at all. In some cases, steps may include additional features not mentioned below, or further steps may be added.

At 305, the UE 115-*b* may receive control signaling from the network entity 105-*b*. In some aspects, the control signaling (e.g., RRC signaling, SSB signaling) may indicate one or more "default" parameters for performing CSF procedures. Default parameters may include, but are not limited to, a default precoder ($P_{Default}$), a default rank indicator (Rank=$RI_{Default}$), a default CQI (e.g., MCS=$CQI_{Default}$), or any combination thereof. In other words, the network entity 105-*b* may instruct the UE 115-*b* to perform initial communications using known parameters (e.g., parameters that are known or configured at both the network entity 105-*b* and the UE 115-*b*).

At 310, the UE 115-*b* may monitor for DMRSs that are transmitted or broadcast by the network entity 105-*b*. In particular, the UE 115-*b* may monitor for DMRSs associated with CSF information between the UE 115-*b* and the network entity 105-*b*. In other words, the UE 115-*b* may monitor for DMRSs in order to preform CSF with the network entity 105-*b*. In some aspects, the UE 115-*b* may monitor for DMRSs based on receiving the control signaling at 305. For example, the UE 115-*b* may monitor for DMRSs in accordance with the parameters (e.g., default parameters) indicated via the control signaling at 305. For instance, the UE 115-*b* may monitor for DMRSs using (e.g., in accordance with) the default precoder ($P_{Default}$), the default rank indicator (Rank=$RI_{Default}$) the default CQI (e.g., MCS=$CQI_{Default}$) or any combination thereof.

At 315, the UE 115-*b* may receive, from the network entity 105-*b*, a DMRS associated with CSF information between the respective devices. The UE 115-*b* may receive, and the network entity 105-*b* may transmit, the DMRS at 315 based on receiving/transmitting the control signaling at 305, monitoring for the DMRS at 310, or both. For example, the network entity 105-*b* may transmit (and the UE 115-*b* may receive) the DMRS at 315 in accordance with the default precoder, the default rank indicator, the default CQI, or any combination thereof.

At 320, the UE 115-*b* may perform a channel estimation for a channel between the UE 115-*b* and the network entity 105-*b* based on the DMRS received at 315. The UE 115-*b* may perform the channel estimation at 320 to identify an optimal CSF or PMIs (e.g., optimal precoder, rank indicator, CQI) that will be used for wireless communications between the UE 115-*b* and the network entity 105-*b*. Stated differently, the UE 115-*b* may perform the channel estimation in order to identify candidate or recommended precoders that the UE 115-*b* will recommend or suggest to the network entity 105-*b* for subsequent communications between the respective devices.

The UE 115-*b* may perform the channel estimation associated with the CSF information of the DMRS based on (e.g., using) the default precoder. In this regard, the UE 115-*b* may perform the channel estimation at 320 based on receiving the control signaling at 305, monitoring for the DMRS at 310, receiving the DMRS at 315, or any combination thereof. In particular, the UE 115-*b* may perform the channel estimation at 320 based on (e.g., using, in accordance with) the default parameter(s) indicated via the control signaling at 305. For example, the UE 115-*b* may perform the channel estimation at 320 in accordance with the default precoder, the default rank indicator, the default CQI (e.g., default MCS), or any combination thereof.

At 325, the UE 115-*b* may determine one or more candidate (e.g., recommended) precoders for wireless communications between the UE 115-*b* and the network entity 105-*b*. In other words, the UE 115-*b* may identify one or more precoders which exhibit sufficient performance, or which exhibit a performance that is greater than some threshold. The UE 115-*b* may determine the one or more candidate precoders at 325 based on receiving the control signaling at 305, monitoring for DMRS at 310, receiving the DMRS at 315, performing the channel estimation at 320, or any combination thereof. For example, the UE 115-*b* may determine the one or more candidate precoders based on one or more measurements that were performed for the channel estimation at 320.

In some implementations, the UE 115-*b* may determine the candidate precoder(s) at 325 by determining or calculating one or more precoder coefficients associated with the respective candidate precoder. For example, the UE 115-*b* may calculate one or more precoder coefficients for a candidate precoder based on the channel estimation at 320. In this example, the candidate precoder may include or be determined according to the one or more precoder coefficients. Selecting or calculating precoder coefficients may be an example of non-codebook-based precoder selection.

Additionally, or alternatively, the UE 115-*b* may select the one or more candidate precoder coefficients from a codebook of precoders (e.g., codebook-based precoder selection). For example, in some implementations, the control signaling at 305 may indicate a codebook of precoders that may be used for wireless communications between the respective devices, where each precoder within the codebook corresponds to a precoder ID. In this example, the UE 115-*b* may select one or more precoders from the codebook as candidate precoders based on the channel estimation performed at 320.

In some implementations, the UE 115-*b* may determine other parameters for wireless communications between the UE 115-*b* and the network entity 105-*b* (e.g., other candidate or recommended parameters), such as candidate rank indicators, candidate CQIs, and the like. Additional candidate parameters may be determined based on the channel estimation performed at 320.

At 330, the UE 115-*b* may transmit, to the network entity 105-*b*, an uplink message indicating the one or more candidate precoders (e.g., recommended precoders) which were determined at 325. In other words, the UE 115-*b* may transmit an uplink message suggesting or recommending the candidate precoders. The UE 115-*b* may transmit the uplink message at 330 based on receiving the control signaling at 305, monitoring for DMRS at 310, receiving the DMRS at 315, performing the channel estimation at 320, determining the candidate precoders at 325, or any combination thereof.

The uplink control message may indicate the candidate precoders as precoders which may (or should) be used for subsequent communications between the UE 115-*b* and the network entity 105-*b*. For example, in cases where the UE 115-*b* determines/calculates precoder coefficients for the candidate precoders, the uplink message may indicate the precoder coefficients for the respective candidate precoders. By way of another example, in cases where the UE 115-*b* selects the candidate precoders from a codebook of precoders, the uplink message may indicate precoder IDs corresponding to the selected candidate precoders.

In some aspects, the UE 115-*b* may transmit the uplink message via an uplink shared channel (e.g., PUSCH), an uplink control channel (e.g., PUCCH), or both. The uplink message may include a UCI message, a MAC-CE message, and the like. The channel used to transmit the uplink message may depend on how the UE 115-*b* indicates the candidate precoders. For example, in cases where the uplink message indicates precoding coefficients for the candidate precoders, the payload of the uplink message may be relatively large. Accordingly, in such cases, the uplink message may be transmitted via an uplink shared channel. Comparatively, in cases where the uplink message indicates precoder IDs for the candidate precoders, the payload may be relatively small, and the uplink message may be transmitted via an uplink control channel.

In additional or alternative implementations, the UE 115-*b* may indicate other candidate parameters for wireless communications between the UE 115-*b* and the network entity 105-*b*. For example, the uplink message may indicate one or more candidate rank indicators, candidate CQIs, and the like. In this regard, the UE 115-*b* may recommend or suggest other parameters that will be used for subsequent communications between the respective devices.

At 335, the UE 115-*b* and the network entity 105-*b* may perform wireless communications with one another. In other words, the UE 115-*b* may transmit uplink signals to the network entity 105-*b*, receive downlink signals from the network entity 105-*b*, or both.

In some implementations, the communications performed at 335 may be performed at 335 in accordance with one or more default parameters. For example, the communications performed at 335 may be performed in accordance with the default precoder and/or other default parameters (e.g., default rank indicator, default CQI) which were configured at 305 and/or used for communicating the DMRS at 315. In particular, the communications at 335 may be performed according to the default precoder and/or other default parameters based on the communications being performed prior to the network entity 105-*b* indicating, activating, or otherwise acknowledging one of the candidate parameters indicated via the uplink message at 330. Stated differently, the UE 115-*b* and the network entity 105-*b* may utilize the default precoder (and other default parameters) for wireless communications until the network entity 105-*b* indicates, activates, or otherwise acknowledges one of the candidate precoders indicated via the uplink message at 330. As such, due to the use of default parameters that may not be optimized for the channel the communications at 335 may suffer from decreased performance. As such, a lower MCS may be used.

At 340, the UE 115-*b* may receive, from the network entity 105-*b*, a downlink message indicating a precoder of the one or more candidate precoders which were indicated via the uplink message at 330. In other words, the downlink message (e.g., DCI, MAC-CE) may indicate, activate, or otherwise acknowledge one of the candidate precoders that was suggested/recommended by the UE 115-*b* via the uplink message at 330. For example, the uplink message may indicate multiple precoder IDs corresponding to multiple candidate precoders, where the downlink message indicates a precoder ID corresponding to the candidate precoder that will be used for subsequent communications.

In this regard, the UE 115-*b* may receive (and the network entity 105-*b* may transmit) the downlink message at 340 based on receiving/transmitting the control signaling at 305, monitoring for DMRS at 310, receiving/transmitting the DMRS at 315, performing the channel estimation at 320, determining the candidate precoders at 325, transmitting/receiving the uplink message at 330, or any combination thereof.

In some aspects, the downlink message will indicate that the network entity 105-*b* intends to adopt the recommendation of the UE 115-*b* associated with which precoder should be used. Additionally, or alternatively, the downlink message may indicate that the network entity 105-*b* will not adopt the candidate precoders recommended by the UE 115-*b*, and may instead indicate a different precoder (e.g., precoder ID) that was not recommended by the UE 115-*b*.

In additional or alternative implementations, the network entity 105-*b* may indicate, activate, or otherwise acknowledge other candidate parameters for wireless communications between the UE 115-*b*. For example, the uplink message at 330 may indicate one or more candidate rank indicators, candidate CQIs, and the like. In this example, the downlink message may indicate one of the candidate rank indicators, candidate CQIs, or both, that will be used for subsequent communications between the respective devices.

In some aspects, the downlink message may indicate a time at which the network entity 105-*b* plans to adopt or otherwise activate the indicated precoder or other parameters. For example, the downlink message may indicate that the precoder indicated via the downlink message will be activated two slots following transmission/reception of the downlink message (e.g., two-slot time offset).

At 345, the UE 115-*b* and the network entity 105-*b* may communicate with one another based on (e.g., using, in accordance with) the indicated precoder. That is, the UE 115-*b* and the network entity 105-*b* may communicate with one another using the precoder that was indicated, activated, or otherwise acknowledged via the downlink message at 340. Moreover, the UE 115-*b* and the network entity 105-*b* may communicate with another in using other parameters which were indicated/acknowledged via the downlink message, including an indicated rank indicator, an indicated CQI, or both. In this regard, the UE 115-*b* and the network entity 105-*b* may communicate with one another at 345 based on transmitting/receiving the uplink message at 330 and the downlink message at 340.

In some implementations, the CSF procedure illustrated throughout steps 310-345 may be performed periodically or at set intervals in order to determine communication parameters (e.g., precoder, rank indicator, CQI) that will be used for wireless communications throughout a certain time period. For example, the CSF procedure illustrated in process flow 300 may be performed at the beginning of each "burst" including a quantity of slots or other TTIs, where the CSF procedure is used to determine communication parameters (e.g., precoder, rank indicator, CQI) that will be used for wireless communications throughout the respective burst.

In this regard, the communications between the UE 115-*b* and the network entity 105-*b* at 345 may be performed in accordance with the identified precoder (and other identified parameters) for a first time interval (e.g., first burst, first quantity of slots). Moreover, one or more steps of the process flow 300 may be repeated prior to (or at the start of) a second time interval in order to identify communication parameters that will be used throughout the second time interval. In this regard, process flow 300 may proceed to 350.

At 350, the UE 115-*b* and the network entity 105-*b* may perform an additional CSF procedure (e.g., precoder selection procedure) for subsequent time intervals. That is, the UE 115-*b* and the network entity 105-*b* may perform one or more of the steps shown and described at 305 through 345 in order to determine communication parameters (e.g., precoder, rank indicator, CQI) that will be used for subsequent time intervals.

For example, at the start of a second time interval (or prior to a second time interval), the UE 115-*b* may monitor for a second DMRS that is transmitted using the default precoder, as shown at 310 and 315. Moreover, the UE 115-*b* may perform a channel estimation and select precoders based on the second DMRS as shown at 320 and 325, recommend candidate precoders via an uplink message as shown at 330, and receive a downlink message indicating one of the candidate precoders as shown at 340. The UE 115-*b* and the network entity 105-*b* may then communicate throughout the second time interval using the indicated precoder, as shown at 345.

Techniques described herein may enable CSF mechanisms to be performed using DMRSs, as opposed to CSI-RSs used by some wireless communications systems. By enabling CSF procedures and mechanisms to be performed using DMRSs, techniques described herein may reduce a quantity of reference signals that are communicated to perform precoder selection, thereby reducing control signaling overhead and network congestion. Moreover, by enabling CSF and precoder selection to be performed using DMRSs, techniques described herein may improve an efficiency of CSF mechanisms for wireless devices including higher quantities and densities of antenna elements per antenna array, thereby enabling CSF in the context of higher-frequency communications.

Figure 4:
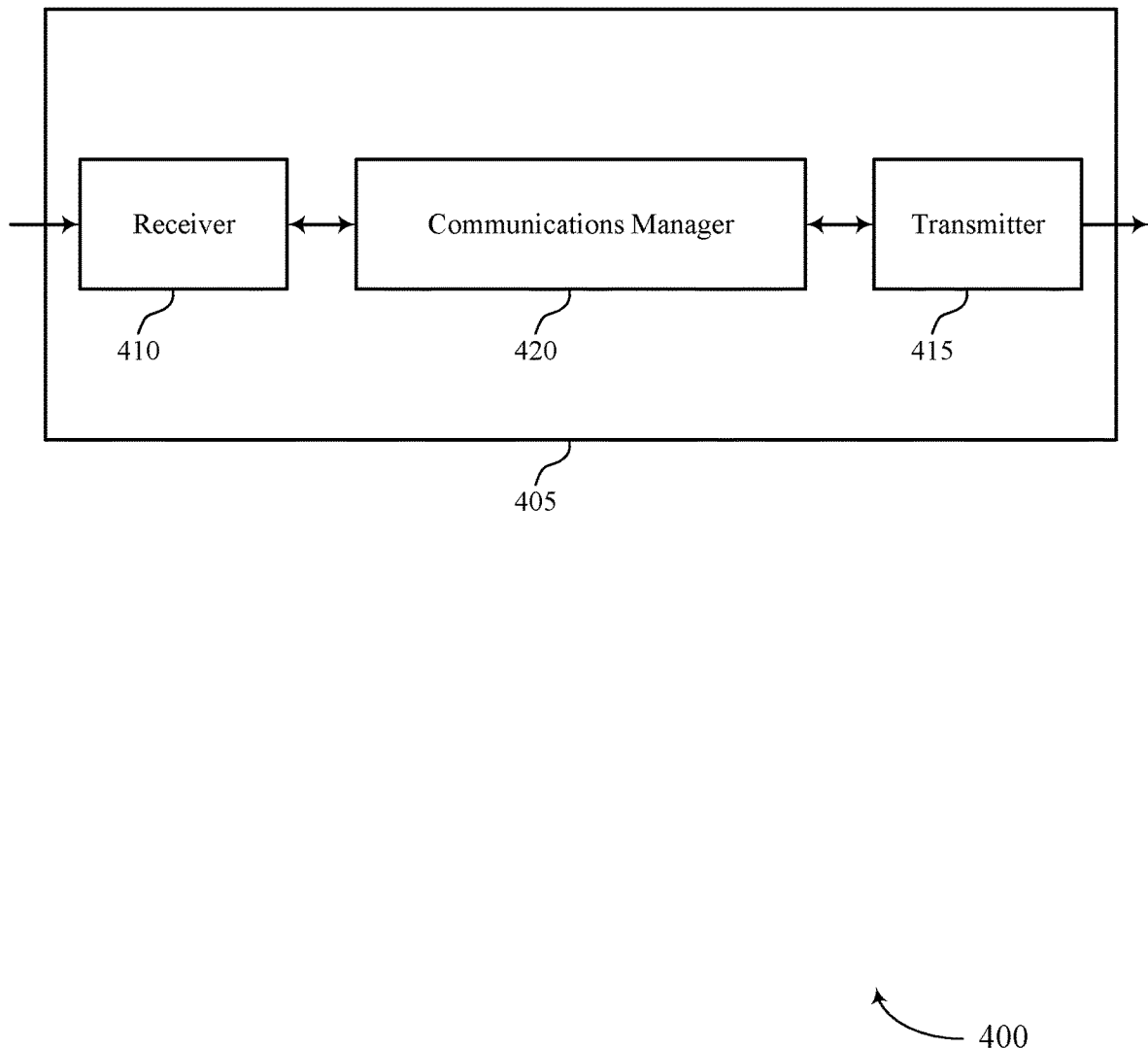
FIGS. 4 and 5 show block diagrams of devices that support CSF using DMRSs in accordance with one or more aspects of the present disclosure.

FIG. 4 shows a block diagram 400 of a device 405 that supports CSF using DMRSs in accordance with one or more aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to CSF using DMRSs). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to CSF using DMRSs). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of CSF using DMRSs as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communication at a UE in accordance with examples as disclosed herein. For example, the communications manager 420 may be configured as or otherwise support a means for monitoring for a DMRS according to a default precoder, the DMRS associated with CSF information. The communications manager 420 may be configured as or otherwise support a means for transmitting an uplink message indicating one or more candidate precoders selected based on the monitoring for the DMRS according to the default precoder. The communications manager 420 may be configured as or otherwise support a means for receiving a downlink message indicating a precoder of the one or more candidate precoders based on transmitting the uplink message. The communications manager 420 may be configured as or otherwise support a means for communicating with a network entity in accordance with the indicated precoder of the one or more candidate precoders based on the downlink message.

By including or configuring the communications manager 420 in accordance with examples as described herein, the device 405 (e.g., a processor controlling or otherwise coupled with the receiver 410, the transmitter 415, the communications manager 420, or a combination thereof) may support techniques which enable CSF mechanisms to be performed using DMRSs, as opposed to CSI-RSs used by some wireless communications systems. By enabling CSF procedures and mechanisms to be performed using DMRSs, techniques described herein may reduce a quantity of reference signals that are communicated to perform precoder selection, thereby reducing control signaling overhead and network congestion. Moreover, by enabling CSF and precoder selection to be performed using DMRSs, techniques described herein may improve an efficiency of CSF mechanisms for wireless devices including higher quantities and densities of antenna elements per antenna array, thereby enabling CSF in the context of higher-frequency communications.

Figure 5:
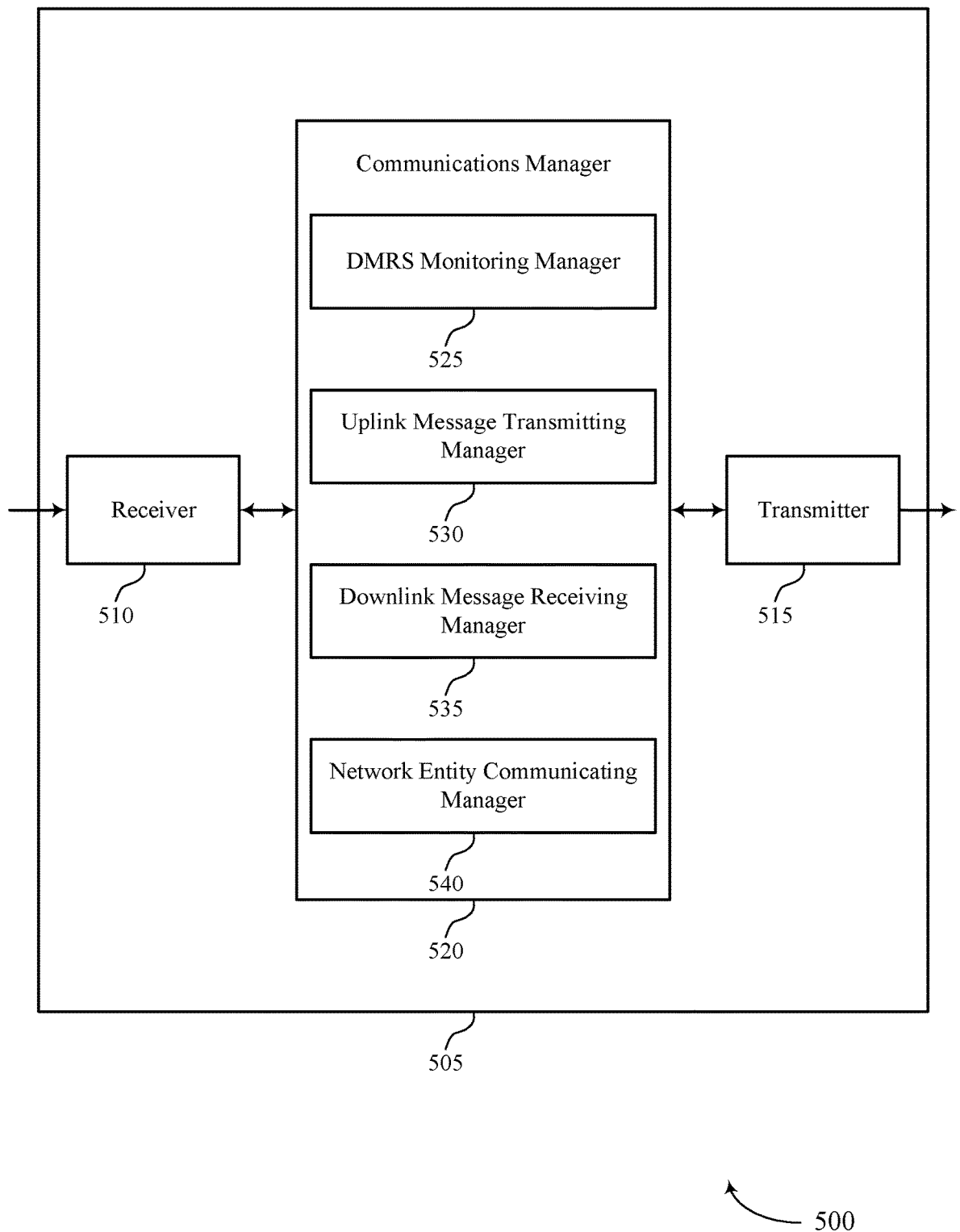

FIG. 5 shows a block diagram 500 of a device 505 that supports CSF using DMRSs in accordance with one or more aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to CSF using DMRSs). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to CSF using DMRSs). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of CSF using DMRSs as described herein. For example, the communications manager 520 may include a DMRS monitoring manager 525, an uplink message transmitting manager 530, a downlink message receiving manager 535, a network entity communicating manager 540, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE in accordance with examples as disclosed herein. The DMRS monitoring manager 525 may be configured as or otherwise support a means for monitoring for a DMRS according to a default precoder, the DMRS associated with CSF information. The uplink message transmitting manager 530 may be configured as or otherwise support a means for transmitting an uplink message indicating one or more candidate precoders selected based on the monitoring for the DMRS according to the default precoder. The downlink message receiving manager 535 may be configured as or otherwise support a means for receiving a downlink message indicating a precoder of the one or more candidate precoders based on transmitting the uplink message. The network entity communicating manager 540 may be configured as or otherwise support a means for communicating with a network entity in accordance with the indicated precoder of the one or more candidate precoders based on the downlink message.

Figure 6:
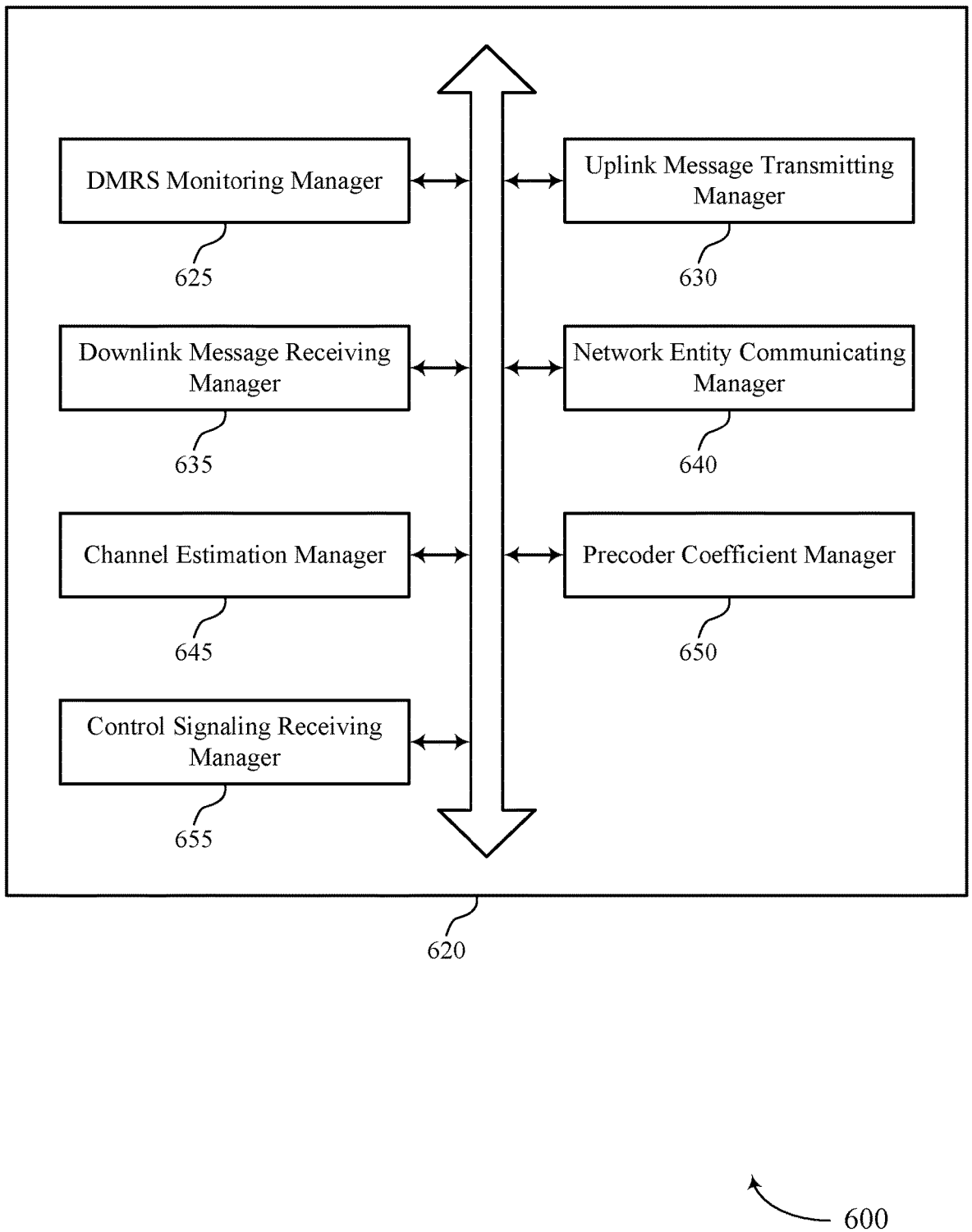
FIG. 6 shows a block diagram of a communications manager that supports CSF using DMRSs in accordance with one or more aspects of the present disclosure.

FIG. 6 shows a block diagram 600 of a communications manager 620 that supports CSF using DMRSs in accordance with one or more aspects of the present disclosure. The communications manager 620 may be an example of aspects of a communications manager 420, a communications manager 520, or both, as described herein. The communications manager 620, or various components thereof, may be an example of means for performing various aspects of CSF using DMRSs as described herein. For example, the communications manager 620 may include a DMRS monitoring manager 625, an uplink message transmitting manager 630, a downlink message receiving manager 635, a network entity communicating manager 640, a channel estimation manager 645, a precoder coefficient manager 650, a control signaling receiving manager 655, or any combination thereof. Each of these components may communicate, directly or indirectly, with one another (e.g., via one or more buses).

The communications manager 620 may support wireless communication at a UE in accordance with examples as disclosed herein. The DMRS monitoring manager 625 may be configured as or otherwise support a means for monitoring for a DMRS according to a default precoder, the DMRS associated with CSF information. The uplink message transmitting manager 630 may be configured as or otherwise support a means for transmitting an uplink message indicating one or more candidate precoders selected based on the monitoring for the DMRS according to the default precoder. The downlink message receiving manager 635 may be configured as or otherwise support a means for receiving a downlink message indicating a precoder of the one or more candidate precoders based on transmitting the uplink message. The network entity communicating manager 640 may be configured as or otherwise support a means for communicating with a network entity in accordance with the indicated precoder of the one or more candidate precoders based on the downlink message.

In some examples, the channel estimation manager 645 may be configured as or otherwise support a means for performing a channel estimation associated with the CSF information based on the DMRS and the default precoder, where the one or more candidate precoders are selected based on the channel estimation.

In some examples, the uplink message transmitting manager 630 may be configured as or otherwise support a means for transmitting, via the uplink message, one or more identifiers associated with the one or more candidate precoders. In some examples, the downlink message receiving manager 635 may be configured as or otherwise support a means for receiving, via the downlink message, an identifier associated with the precoder, the identifier included within the one or more identifiers, where communicating in accordance with the precoder is based on receiving the identifier.

In some examples, the network entity communicating manager 640 may be configured as or otherwise support a means for communicating with the network entity in accordance with the default precoder for at least a portion of a time interval between transmission of the uplink message and reception of the downlink message.

In some examples, the channel estimation manager 645 may be configured as or otherwise support a means for performing a channel estimation associated with the CSF information based on the DMRS and the default precoder. In some examples, the uplink message transmitting manager 630 may be configured as or otherwise support a means for transmitting, via the uplink message, one or more candidate rank indicators, one or more candidate CQIs, or both, where the one or more candidate rank indicators, the one or more candidate CQIs, or both, are determined based on the channel estimation. In some examples, the downlink message receiving manager 635 may be configured as or otherwise support a means for receiving, via the downlink message, a rank indicator from the one or more candidate rank indicators, a CQI from the one or more candidate CQIs, or both, where communicating with the network entity is performed in accordance with the indicated rank indicator, the indicated CQI, or both.

In some examples, to support transmitting the uplink message indicating the one or more candidate precoders, the precoder coefficient manager 650 may be configured as or otherwise support a means for indicating, via the uplink message, a set of precoder coefficients associated with the precoder of the one or more candidate precoders. In some examples, the precoder coefficient manager 650 may be configured as or otherwise support a means for determining the set of precoder coefficients associated with the precoder based on a channel estimation associated with the DMRS.

In some examples, the DMRS is associated with a first time interval, and the DMRS monitoring manager 625 may be configured as or otherwise support a means for monitoring for a second DMRS according to the default precoder, the second DMRS associated with a second time interval different from the first time interval. In some examples, the DMRS is associated with a first time interval, and the uplink message transmitting manager 630 may be configured as or otherwise support a means for transmitting a second uplink message indicating one or more additional candidate precoders selected based on the monitoring for the second DMRS according to the default precoder. In some examples, the DMRS is associated with a first time interval, and the downlink message receiving manager 635 may be configured as or otherwise support a means for receiving a second downlink message indicating a second precoder of the one or more additional candidate precoders based on transmitting the second uplink message. In some examples, the DMRS is associated with a first time interval, and the network entity communicating manager 640 may be configured as or otherwise support a means for communicating in accordance with the second precoder of the one or more additional candidate precoders for at least a portion of the second time interval and based on the second downlink message.

In some examples, the DMRS is associated with a default rank indicator, and the channel estimation manager 645 may be configured as or otherwise support a means for performing a channel estimation for the DMRS based on the default rank indicator, the default CQI, or both, where the one or more candidate precoders are selected based on the channel estimation.

In some examples, the control signaling receiving manager 655 may be configured as or otherwise support a means for receiving control signaling indicating the default precoder, the default rank indicator, the default CQI, or any combination thereof, where monitoring for the DMRS, performing the channel estimation, or both, is based on the control signaling.

In some examples, the channel estimation manager 645 may be configured as or otherwise support a means for performing a channel estimation for the DMRS based on the monitoring, where the one or more candidate precoders are selected from a precoder codebook based on the channel estimation. In some examples, the uplink message is transmitted via an uplink shared channel.

Figure 7:
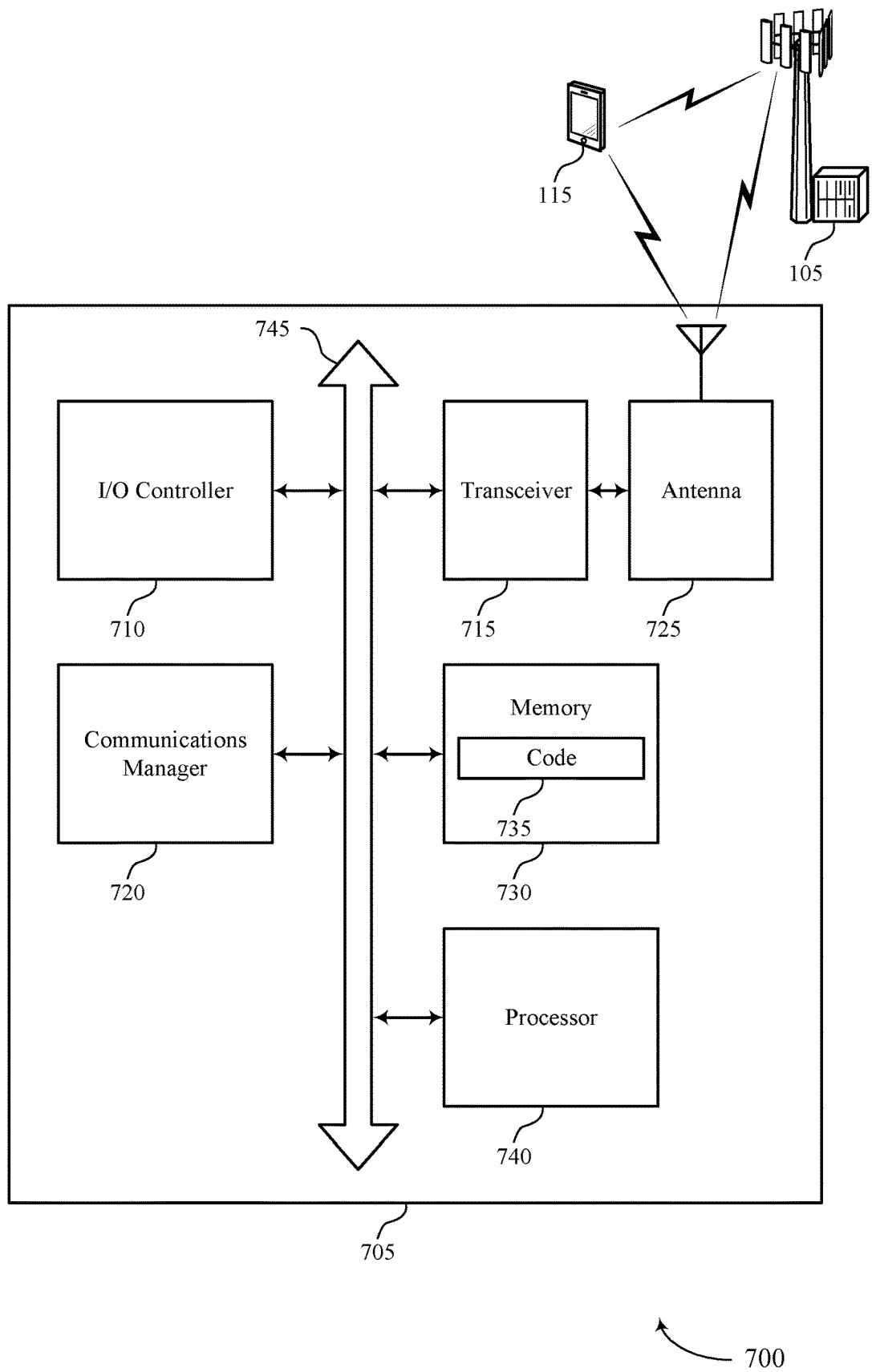
FIG. 7 shows a diagram of a system including a device that supports CSF using DMRSs in accordance with one or more aspects of the present disclosure.

FIG. 7 shows a diagram of a system 700 including a device 705 that supports CSF using DMRSs in accordance with one or more aspects of the present disclosure. The device 705 may be an example of or include the components of a device 405, a device 505, or a UE 115 as described herein. The device 705 may communicate (e.g., wirelessly) with one or more network entities 105, one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting CSF using DMRSs). For example, the device 705 or a component of the device 705 may include a processor 740 and memory 730 coupled with or to the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for monitoring for a DMRS according to a default precoder, the DMRS associated with CSF information. The communications manager 720 may be configured as or otherwise support a means for transmitting an uplink message indicating one or more candidate precoders selected based on the monitoring for the DMRS according to the default precoder. The communications manager 720 may be configured as or otherwise support a means for receiving a downlink message indicating a precoder of the one or more candidate precoders based on transmitting the uplink message. The communications manager 720 may be configured as or otherwise support a means for communicating with a network entity in accordance with the indicated precoder of the one or more candidate precoders based on the downlink message.

By including or configuring the communications manager 720 in accordance with examples as described herein, the device 705 may support techniques enable CSF mechanisms to be performed using DMRSs, as opposed to CSI-RSs used by some wireless communications systems. By enabling CSF procedures and mechanisms to be performed using DMRSs, techniques described herein may reduce a quantity of reference signals that are communicated to perform precoder selection, thereby reducing control signaling overhead and network congestion. Moreover, by enabling CSF and precoder selection to be performed using DMRSs, techniques described herein may improve an efficiency of CSF mechanisms for wireless devices including higher quantities and densities of antenna elements per antenna array, thereby enabling CSF in the context of higher-frequency communications.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of CSF using DMRSs as described herein, or the processor 740 and the memory 730 may be otherwise configured to perform or support such operations.

Figure 8:
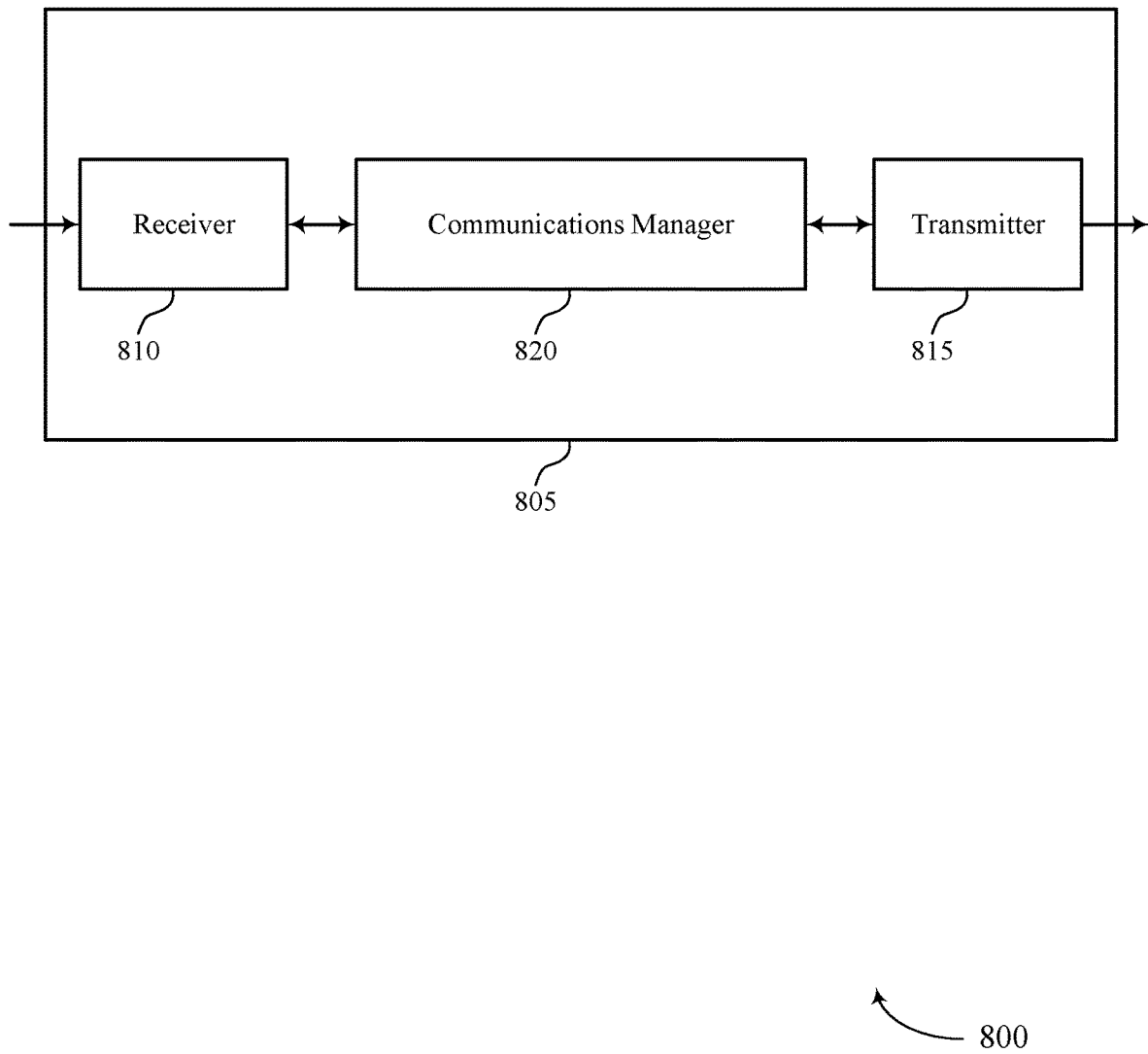
FIGS. 8 and 9 show block diagrams of devices that support CSF using DMRSs in accordance with one or more aspects of the present disclosure.

FIG. 8 shows a block diagram 800 of a device 805 that supports CSF using DMRSs in accordance with one or more aspects of the present disclosure. The device 805 may be an example of aspects of a network entity 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations thereof or various components thereof may be examples of means for performing various aspects of CSF using DMRSs as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a network entity in accordance with examples as disclosed herein. For example, the communications manager 820 may be configured as or otherwise support a means for transmitting, to a UE, a DMRS according to a default precoder, the DMRS associated with CSF information. The communications manager 820 may be configured as or otherwise support a means for receiving an uplink message indicating one or more candidate precoders selected based on transmitting the DMRS according to the default precoder. The communications manager 820 may be configured as or otherwise support a means for transmitting a downlink message indicating a precoder of the one or more candidate precoders based on receiving the uplink message. The communications manager 820 may be configured as or otherwise support a means for communicating with the UE in accordance with the indicated precoder of the one or more candidate precoders based on the downlink message.

By including or configuring the communications manager 820 in accordance with examples as described herein, the device 805 (e.g., a processor controlling or otherwise coupled with the receiver 810, the transmitter 815, the communications manager 820, or a combination thereof) may support techniques enable CSF mechanisms to be performed using DMRSs, as opposed to CSI-RSs used by some wireless communications systems. By enabling CSF procedures and mechanisms to be performed using DMRSs, techniques described herein may reduce a quantity of reference signals that are communicated to perform precoder selection, thereby reducing control signaling overhead and network congestion. Moreover, by enabling CSF and precoder selection to be performed using DMRSs, techniques described herein may improve an efficiency of CSF mechanisms for wireless devices including higher quantities and densities of antenna elements per antenna array, thereby enabling CSF in the context of higher-frequency communications.

Figure 9:
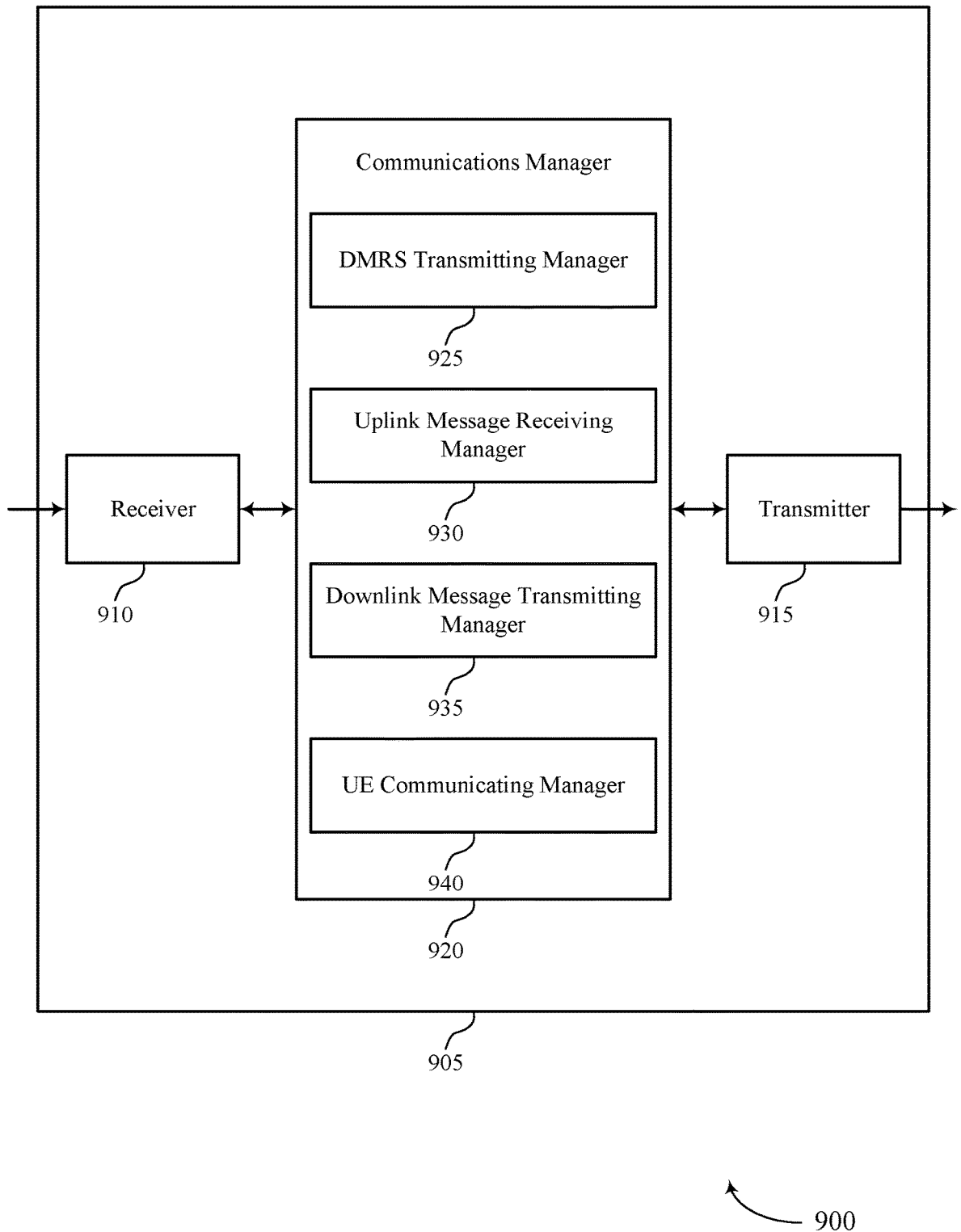

FIG. 9 shows a block diagram 900 of a device 905 that supports CSF using DMRSs in accordance with one or more aspects of the present disclosure. The device 905 may be an example of aspects of a device 805 or a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of CSF using DMRSs as described herein. For example, the communications manager 920 may include a DMRS transmitting manager 925, an uplink message receiving manager 930, a downlink message transmitting manager 935, a UE communicating manager 940, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a network entity in accordance with examples as disclosed herein. The DMRS transmitting manager 925 may be configured as or otherwise support a means for transmitting, to a UE, a DMRS according to a default precoder, the DMRS associated with CSF information. The uplink message receiving manager 930 may be configured as or otherwise support a means for receiving an uplink message indicating one or more candidate precoders selected based on transmitting the DMRS according to the default precoder. The downlink message transmitting manager 935 may be configured as or otherwise support a means for transmitting a downlink message indicating a precoder of the one or more candidate precoders based on receiving the uplink message. The UE communicating manager 940 may be configured as or otherwise support a means for communicating with the UE in accordance with the indicated precoder of the one or more candidate precoders based on the downlink message.

Figure 10:
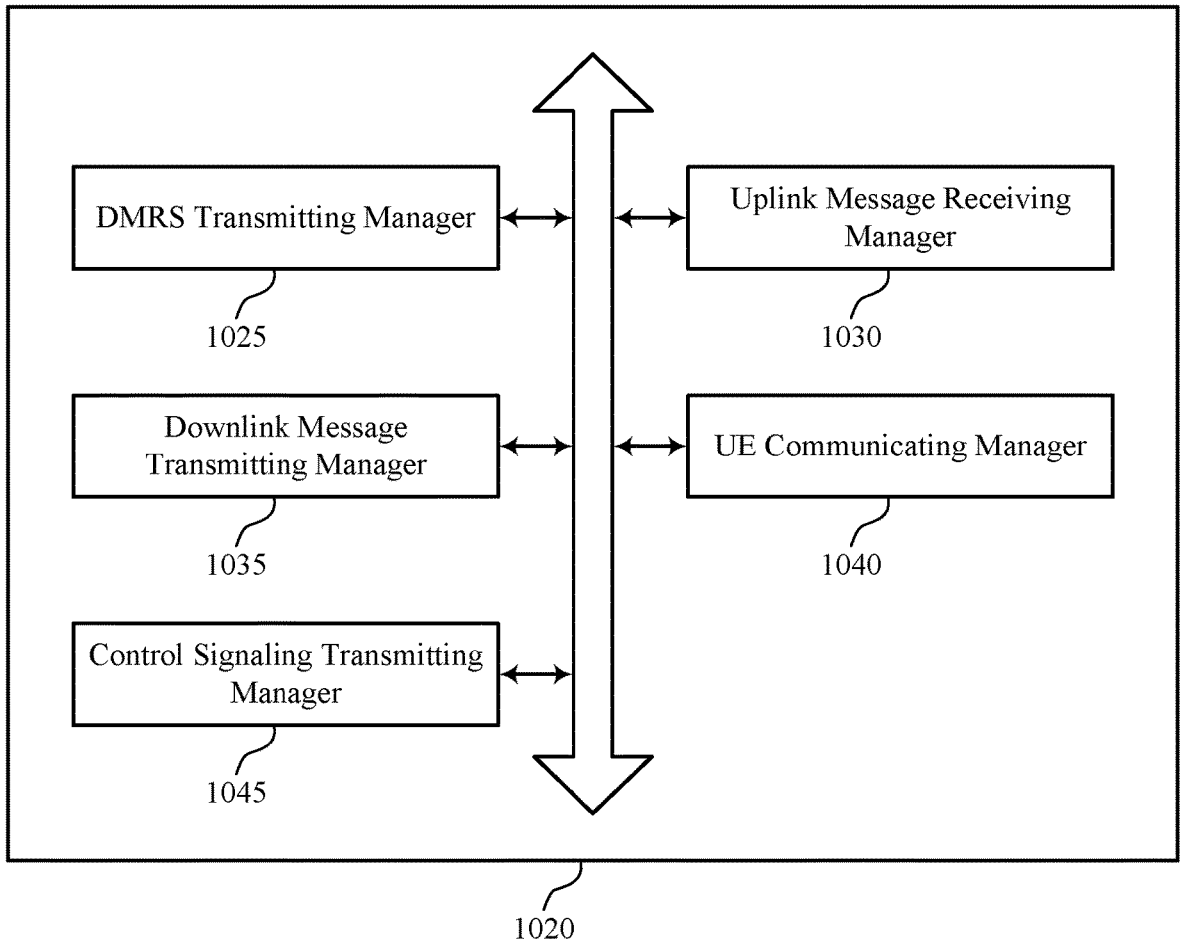
FIG. 10 shows a block diagram of a communications manager that supports CSF using DMRSs in accordance with one or more aspects of the present disclosure.

FIG. 10 shows a block diagram 1000 of a communications manager 1020 that supports CSF using DMRSs in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of CSF using DMRSs as described herein. For example, the communications manager 1020 may include a DMRS transmitting manager 1025, an uplink message receiving manager 1030, a downlink message transmitting manager 1035, a UE communicating manager 1040, a control signaling transmitting manager 1045, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1020 may support wireless communication at a network entity in accordance with examples as disclosed herein. The DMRS transmitting manager 1025 may be configured as or otherwise support a means for transmitting, to a UE, a DMRS according to a default precoder, the DMRS associated with CSF information. The uplink message receiving manager 1030 may be configured as or otherwise support a means for receiving an uplink message indicating one or more candidate precoders selected based on transmitting the DMRS according to the default precoder. The downlink message transmitting manager 1035 may be configured as or otherwise support a means for transmitting a downlink message indicating a precoder of the one or more candidate precoders based on receiving the uplink message. The UE communicating manager 1040 may be configured as or otherwise support a means for communicating with the UE in accordance with the indicated precoder of the one or more candidate precoders based on the downlink message.

In some examples, the uplink message receiving manager 1030 may be configured as or otherwise support a means for receiving, via the uplink message, one or more identifiers associated with the one or more candidate precoders. In some examples, the downlink message transmitting manager 1035 may be configured as or otherwise support a means for transmitting, via the downlink message, an identifier associated with the precoder, the identifier included within the one or more identifiers, where communicating in accordance with the precoder is based on transmitting the identifier.

In some examples, the UE communicating manager 1040 may be configured as or otherwise support a means for communicating with the UE in accordance with the default precoder for at least a portion of a time interval between reception of the uplink message and transmission of the downlink message.

In some examples, the uplink message receiving manager 1030 may be configured as or otherwise support a means for receiving, via the uplink message, one or more candidate rank indicators, one or more candidate CQIs, or both, where the one or more candidate rank indicators, the one or more candidate CQIs, or both, are based on transmitting the DMRS according to the default precoder. In some examples, the downlink message transmitting manager 1035 may be configured as or otherwise support a means for transmitting, via the downlink message, a rank indicator from the one or more candidate rank indicators, a CQI from the one or more candidate CQIs, or both, where communicating with the UE is performed in accordance with the indicated rank indicator, the indicated CQI, or both.

In some examples, the uplink message indicates a set of precoder coefficients associated with the precoder of the one or more candidate precoders.

In some examples, the DMRS is associated with a first time interval, and the DMRS transmitting manager 1025 may be configured as or otherwise support a means for transmitting a second DMRS according to the default precoder, the second DMRS associated with a second time interval different from the first time interval. In some examples, the DMRS is associated with a first time interval, and the uplink message receiving manager 1030 may be configured as or otherwise support a means for receiving a second uplink message indicating one or more additional candidate precoders selected based on transmitting the second DMRS according to the default precoder. In some examples, the DMRS is associated with a first time interval, and the downlink message transmitting manager 1035 may be configured as or otherwise support a means for transmitting a second downlink message indicating a second precoder of the one or more additional candidate precoders based on receiving the second uplink message. In some examples, the DMRS is associated with a first time interval, and the UE communicating manager 1040 may be configured as or otherwise support a means for communicating in accordance with the second precoder of the one or more additional candidate precoders for at least a portion of the second time interval and based on the second downlink message.

In some examples, the control signaling transmitting manager 1045 may be configured as or otherwise support a means for transmitting control signaling indicating a default precoder, a default rank indicator, a default CQI, or any combination thereof, where transmitting the DMRS, receiving the uplink message, or both, is based on the control signaling.

In some examples, the one or more candidate precoders are selected from a precoder codebook based on transmitting the DMRS according to the default precoder. In some examples, the uplink message is received via an uplink shared channel.

Figure 11:
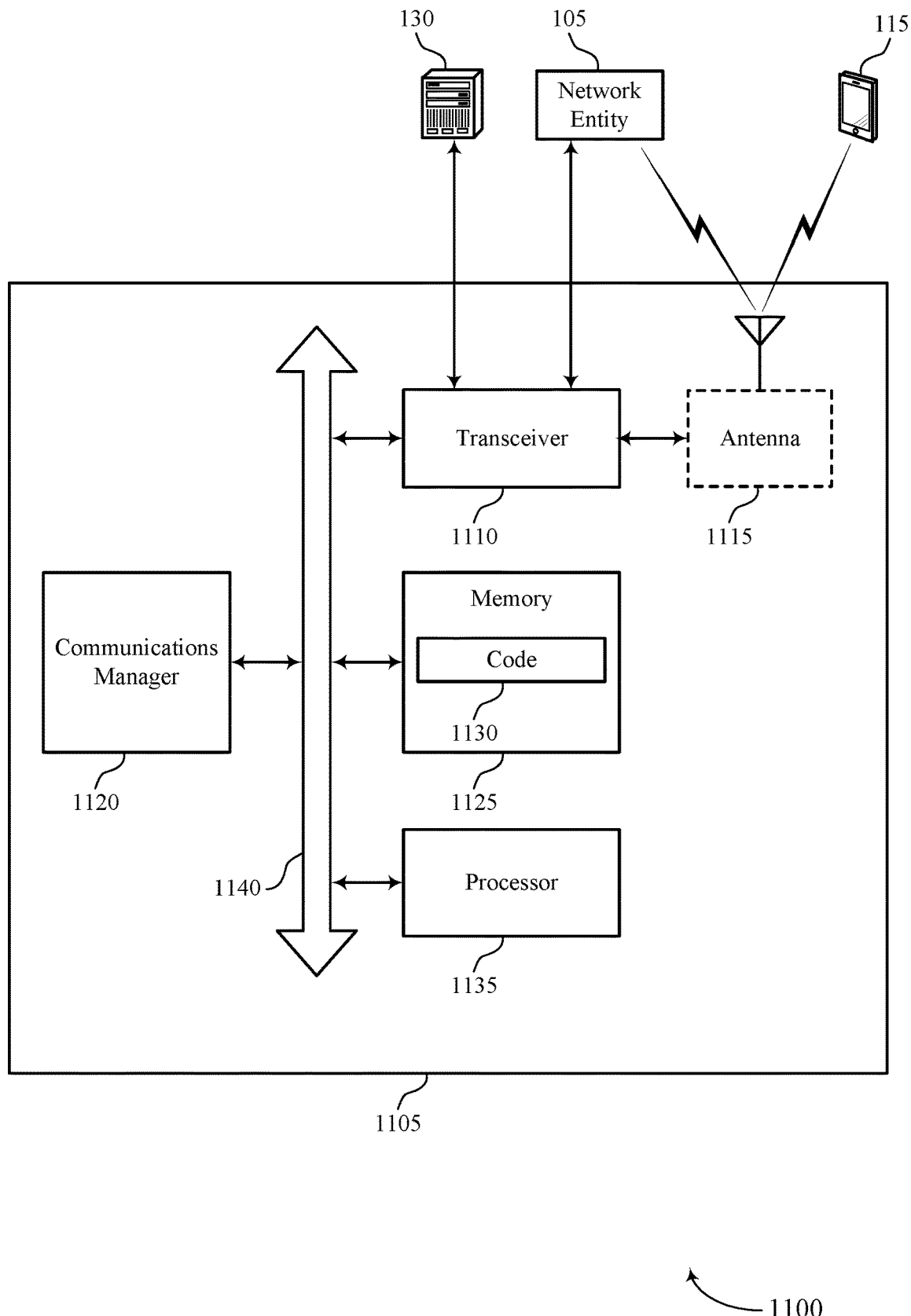
FIG. 11 shows a diagram of a system including a device that supports CSF using DMRSs in accordance with one or more aspects of the present disclosure.

FIG. 11 shows a diagram of a system 1100 including a device 1105 that supports CSF using DMRSs in accordance with one or more aspects of the present disclosure. The device 1105 may be an example of or include the components of a device 805, a device 905, or a network entity 105 as described herein. The device 1105 may communicate with one or more network entities 105, one or more UEs 115, or any combination thereof, which may include communications over one or more wired interfaces, over one or more wireless interfaces, or any combination thereof. The device 1105 may include components that support outputting and obtaining communications, such as a communications manager 1120, a transceiver 1110, an antenna 1115, a memory 1125, code 1130, and a processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. The transceiver 1110, or the transceiver 1110 and one or more antennas 1115 or wired interfaces, where applicable, may be an example of a transmitter 815, a transmitter 915, a receiver 810, a receiver 910, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1125 may include RAM and ROM. The memory 1125 may store computer-readable, computer-executable code 1130 including instructions that, when executed by the processor 1135, cause the device 1105 to perform various functions described herein. The code 1130 may be stored in a non-transitory computer-readable medium such as system memory or another type of memory. In some cases, the code 1130 may not be directly executable by the processor 1135 but may cause a computer (e.g., when compiled and executed) to perform functions described herein. In some cases, the memory 1125 may contain, among other things, a BIOS which may control basic hardware or software operation such as the interaction with peripheral components or devices.

The processor 1135 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1135 may be configured to operate a memory array using a memory controller. In some other cases, a memory controller may be integrated into the processor 1135. The processor 1135 may be configured to execute computer-readable instructions stored in a memory (e.g., the memory 1125) to cause the device 1105 to perform various functions (e.g., functions or tasks supporting CSF using DMRSs). For example, the device 1105 or a component of the device 1105 may include a processor 1135 and memory 1125 coupled with the processor 1135, the processor 1135 and memory 1125 configured to perform various functions described herein. The processor 1135 may be an example of a cloud-computing platform (e.g., one or more physical nodes and supporting software such as operating systems, virtual machines, or container instances) that may host the functions (e.g., by executing code 1130) to perform the functions of the device 1105.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the memory 1125, the code 1130, and the processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with other network entities 105, and may include a controller or scheduler for controlling communications with UEs 115 in cooperation with other network entities 105. In some examples, the communications manager 1120 may support an X2 interface within an LTE/LTE-A wireless communications network technology to provide communication between network entities 105.

The communications manager 1120 may support wireless communication at a network entity in accordance with examples as disclosed herein. For example, the communications manager 1120 may be configured as or otherwise support a means for transmitting, to a UE, a DMRS according to a default precoder, the DMRS associated with CSF information. The communications manager 1120 may be configured as or otherwise support a means for receiving an uplink message indicating one or more candidate precoders selected based on transmitting the DMRS according to the default precoder. The communications manager 1120 may be configured as or otherwise support a means for transmitting a downlink message indicating a precoder of the one or more candidate precoders based on receiving the uplink message. The communications manager 1120 may be configured as or otherwise support a means for communicating with the UE in accordance with the indicated precoder of the one or more candidate precoders based on the downlink message.

By including or configuring the communications manager 1120 in accordance with examples as described herein, the device 1105 may support techniques enable CSF mechanisms to be performed using DMRSs, as opposed to CSI-RSs used by some wireless communications systems. By enabling CSF procedures and mechanisms to be performed using DMRSs, techniques described herein may reduce a quantity of reference signals that are communicated to perform precoder selection, thereby reducing control signaling overhead and network congestion. Moreover, by enabling CSF and precoder selection to be performed using DMRSs, techniques described herein may improve an efficiency of CSF mechanisms for wireless devices including higher quantities and densities of antenna elements per antenna array, thereby enabling CSF in the context of higher-frequency communications.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the processor 1135, the memory 1125, the code 1130, the transceiver 1110, or any combination thereof. For example, the code 1130 may include instructions executable by the processor 1135 to cause the device 1105 to perform various aspects of CSF using DMRSs as described herein, or the processor 1135 and the memory 1125 may be otherwise configured to perform or support such operations.

Figure 12:
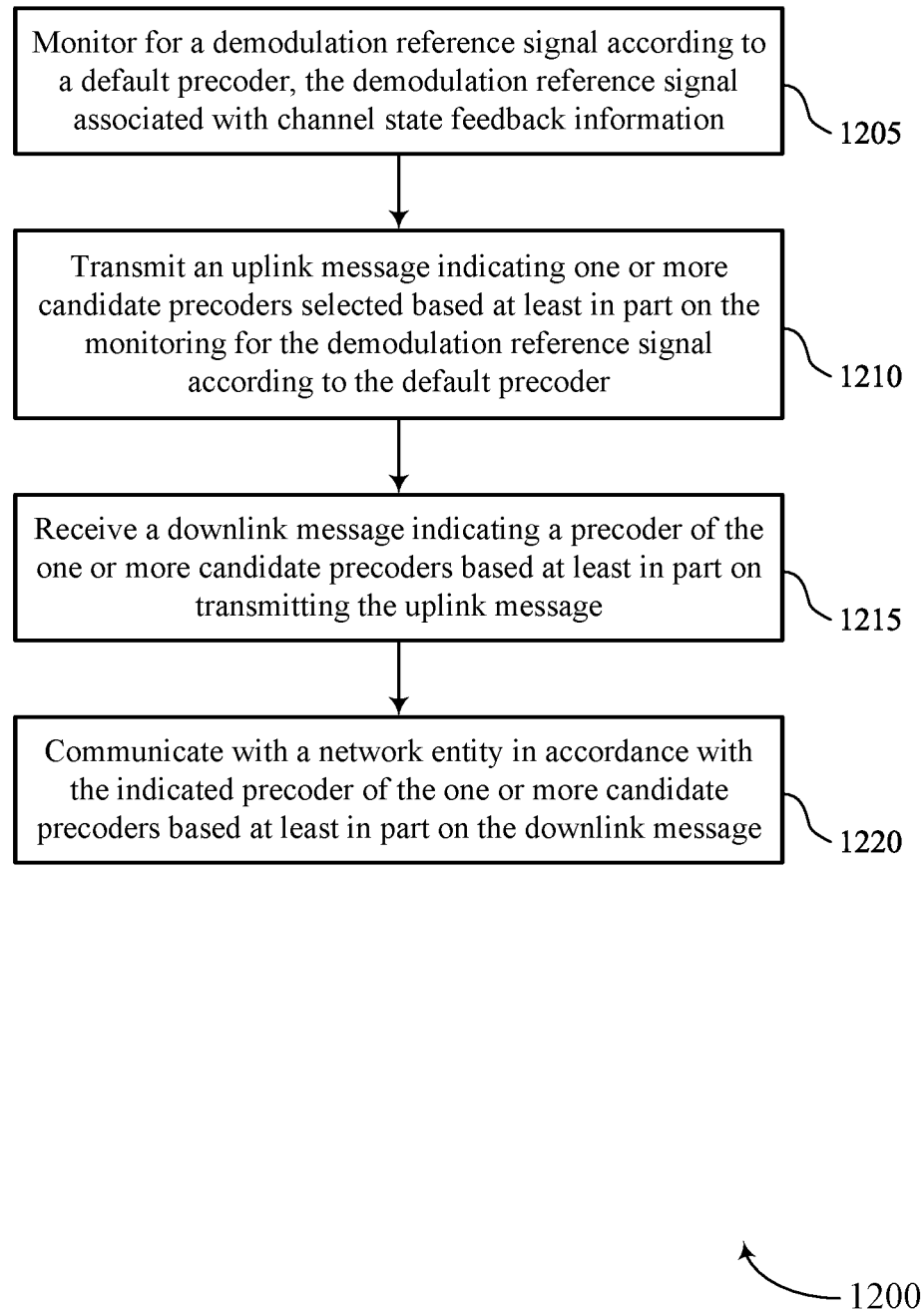
FIGS. 12 through 15 show flowcharts illustrating methods that support CSF using DMRSs in accordance with one or more aspects of the present disclosure.

FIG. 12 shows a flowchart illustrating a method 1200 that supports CSF using DMRSs in accordance with one or more aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include monitoring for a DMRS according to a default precoder, the DMRS associated with CSF information. The operations of 1205 may be performed in accordance with examples as disclosed herein. In some examples, aspects of the operations of 1205 may be performed by a DMRS monitoring manager 625 as described with reference to FIG. 6.

At 1210, the method may include transmitting an uplink message indicating one or more candidate precoders selected based on the monitoring for the DMRS according to the default precoder. The operations of 1210 may be performed in accordance with examples as disclosed herein. In some examples, aspects of the operations of 1210 may be performed by an uplink message transmitting manager 630 as described with reference to FIG. 6.

At 1215, the method may include receiving a downlink message indicating a precoder of the one or more candidate precoders based on transmitting the uplink message. The operations of 1215 may be performed in accordance with examples as disclosed herein. In some examples, aspects of the operations of 1215 may be performed by a downlink message receiving manager 635 as described with reference to FIG. 6.

At 1220, the method may include communicating with a network entity in accordance with the indicated precoder of the one or more candidate precoders based on the downlink message. The operations of 1220 may be performed in accordance with examples as disclosed herein. In some examples, aspects of the operations of 1220 may be performed by a network entity communicating manager 640 as described with reference to FIG. 6.

Figure 13:
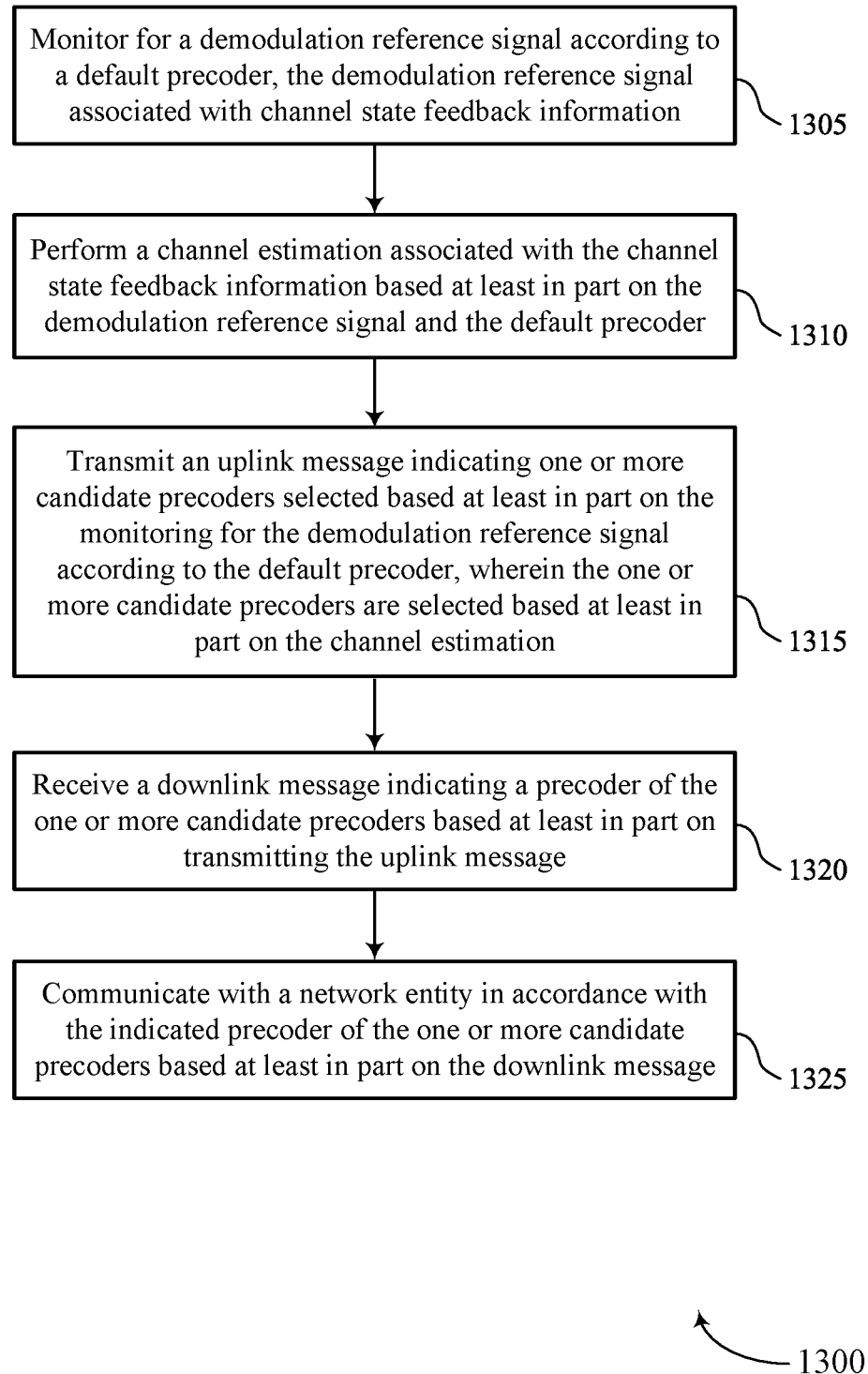

FIG. 13 shows a flowchart illustrating a method 1300 that supports CSF using DMRSs in accordance with one or more aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1305, the method may include monitoring for a DMRS according to a default precoder, the DMRS associated with CSF information. The operations of 1305 may be performed in accordance with examples as disclosed herein. In some examples, aspects of the operations of 1305 may be performed by a DMRS monitoring manager 625 as described with reference to FIG. 6.

At 1310, the method may include performing a channel estimation associated with the CSF information based on the DMRS and the default precoder. The operations of 1310 may be performed in accordance with examples as disclosed herein. In some examples, aspects of the operations of 1310 may be performed by a channel estimation manager 645 as described with reference to FIG. 6.

At 1315, the method may include transmitting an uplink message indicating one or more candidate precoders selected based on the monitoring for the DMRS according to the default precoder, where the one or more candidate precoders are selected based on the channel estimation. The operations of 1315 may be performed in accordance with examples as disclosed herein. In some examples, aspects of the operations of 1315 may be performed by an uplink message transmitting manager 630 as described with reference to FIG. 6.

At 1320, the method may include receiving a downlink message indicating a precoder of the one or more candidate precoders based on transmitting the uplink message. The operations of 1320 may be performed in accordance with examples as disclosed herein. In some examples, aspects of the operations of 1320 may be performed by a downlink message receiving manager 635 as described with reference to FIG. 6.

At 1325, the method may include communicating with a network entity in accordance with the indicated precoder of the one or more candidate precoders based on the downlink message. The operations of 1325 may be performed in accordance with examples as disclosed herein. In some examples, aspects of the operations of 1325 may be performed by a network entity communicating manager 640 as described with reference to FIG. 6.

Figure 14:
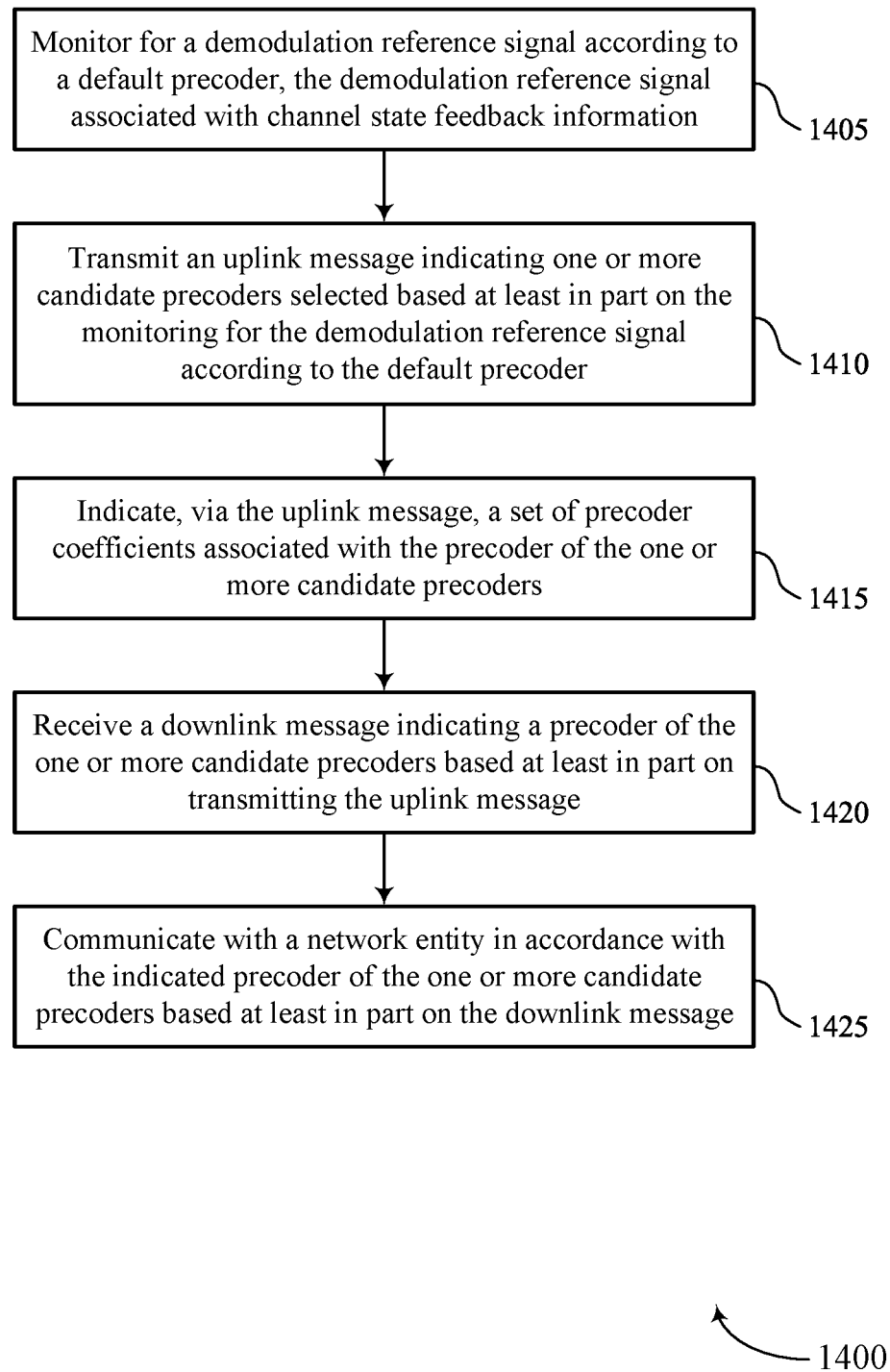

FIG. 14 shows a flowchart illustrating a method 1400 that supports CSF using DMRSs in accordance with one or more aspects of the present disclosure. The operations of the method 1400 may be implemented by a UE or its components as described herein. For example, the operations of the method 1400 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1405, the method may include monitoring for a DMRS according to a default precoder, the DMRS associated with CSF information. The operations of 1405 may be performed in accordance with examples as disclosed herein. In some examples, aspects of the operations of 1405 may be performed by a DMRS monitoring manager 625 as described with reference to FIG. 6.

At 1410, the method may include transmitting an uplink message indicating one or more candidate precoders selected based on the monitoring for the DMRS according to the default precoder. The operations of 1410 may be performed in accordance with examples as disclosed herein. In some examples, aspects of the operations of 1410 may be performed by an uplink message transmitting manager 630 as described with reference to FIG. 6.

At 1415, the method may include indicating, via the uplink message, a set of precoder coefficients associated with the precoder of the one or more candidate precoders. The operations of 1415 may be performed in accordance with examples as disclosed herein. In some examples, aspects of the operations of 1415 may be performed by a precoder coefficient manager 650 as described with reference to FIG. 6.

At 1420, the method may include receiving a downlink message indicating a precoder of the one or more candidate precoders based on transmitting the uplink message. The operations of 1420 may be performed in accordance with examples as disclosed herein. In some examples, aspects of the operations of 1420 may be performed by a downlink message receiving manager 635 as described with reference to FIG. 6.

At 1425, the method may include communicating with a network entity in accordance with the indicated precoder of the one or more candidate precoders based on the downlink message. The operations of 1425 may be performed in accordance with examples as disclosed herein. In some examples, aspects of the operations of 1425 may be performed by a network entity communicating manager 640 as described with reference to FIG. 6.

Figure 15:
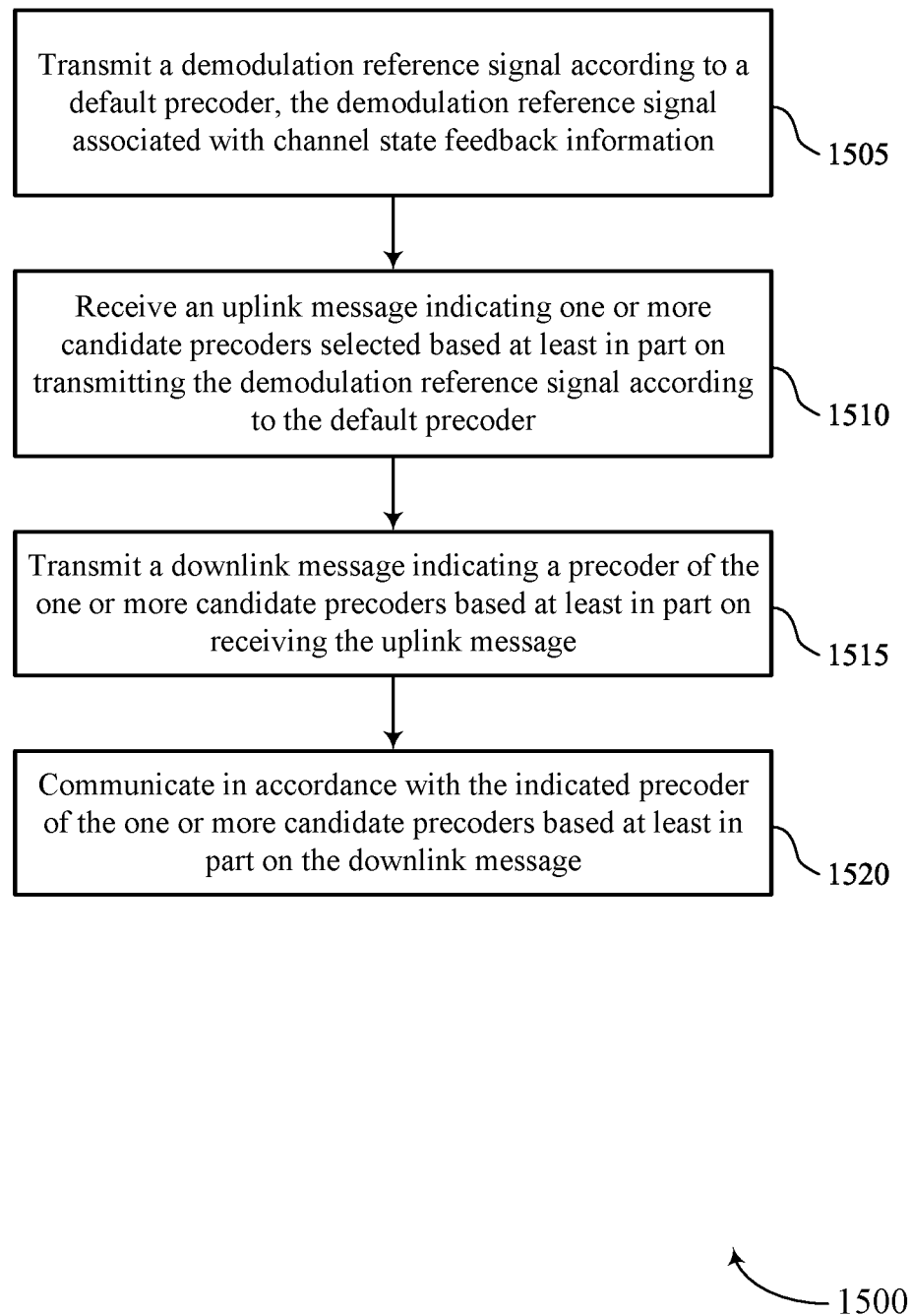

FIG. 15 shows a flowchart illustrating a method 1500 that supports CSF using DMRSs in accordance with one or more aspects of the present disclosure. The operations of the method 1500 may be implemented by a network entity or its components as described herein. For example, the operations of the method 1500 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1505, the method may include transmitting, to a UE, a DMRS according to a default precoder, the DMRS associated with CSF information. The operations of 1505 may be performed in accordance with examples as disclosed herein. In some examples, aspects of the operations of 1505 may be performed by a DMRS transmitting manager 1025 as described with reference to FIG. 10.

At 1510, the method may include receiving an uplink message indicating one or more candidate precoders selected based on transmitting the DMRS according to the default precoder. The operations of 1510 may be performed in accordance with examples as disclosed herein. In some examples, aspects of the operations of 1510 may be performed by an uplink message receiving manager 1030 as described with reference to FIG. 10.

At 1515, the method may include transmitting a downlink message indicating a precoder of the one or more candidate precoders based on receiving the uplink message. The operations of 1515 may be performed in accordance with examples as disclosed herein. In some examples, aspects of the operations of 1515 may be performed by a downlink message transmitting manager 1035 as described with reference to FIG. 10.

At 1520, the method may include communicating with the UE in accordance with the indicated precoder of the one or more candidate precoders based on the downlink message. The operations of 1520 may be performed in accordance with examples as disclosed herein. In some examples, aspects of the operations of 1520 may be performed by a UE communicating manager 1040 as described with reference to FIG. 10.

The following provides an overview of aspects of the present disclosure:

Aspect 1: A method for wireless communication at a UE, comprising: monitoring for a DMRS according to a default precoder, the DMRS associated with CSF information; transmitting an uplink message indicating one or more candidate precoders selected based at least in part on the monitoring for the DMRS according to the default precoder; receiving a downlink message indicating a precoder of the one or more candidate precoders based at least in part on transmitting the uplink message; and communicating with a network entity in accordance with the indicated precoder of the one or more candidate precoders based at least in part on the downlink message.

Aspect 2: The method of aspect 1, further comprising: performing a channel estimation associated with the CSF information based at least in part on the DMRS and the default precoder, wherein the one or more candidate precoders are selected based at least in part on the channel estimation.

Aspect 3: The method of any of aspects 1 through 2, further comprising: transmitting, via the uplink message, one or more identifiers associated with the one or more candidate precoders; and receiving, via the downlink message, an identifier associated with the precoder, the identifier included within the one or more identifiers, wherein communicating in accordance with the precoder is based at least in part on receiving the identifier.

Aspect 4: The method of any of aspects 1 through 3, further comprising: communicating with the network entity in accordance with the default precoder for at least a portion of a time interval between transmission of the uplink message and reception of the downlink message.

Aspect 5: The method of any of aspects 1 through 4, further comprising: performing a channel estimation associated with the CSF information based at least in part on the DMRS and the default precoder; transmitting, via the uplink message, one or more candidate rank indicators, one or more candidate CQIs, or both, wherein the one or more candidate rank indicators, the one or more candidate CQIs, or both, are determined based at least in part on the channel estimation; and receiving, via the downlink message, a rank indicator from the one or more candidate rank indicators, a CQI from the one or more candidate CQIs, or both, wherein communicating with the network entity is performed in accordance with the indicated rank indicator, the indicated CQI, or both.

Aspect 6: The method of any of aspects 1 through 5, wherein transmitting the uplink message indicating the one or more candidate precoders comprises: indicating, via the uplink message, a set of precoder coefficients associated with the precoder of the one or more candidate precoders.

Aspect 7: The method of aspect 6, further comprising: determining the set of precoder coefficients associated with the precoder based at least in part on a channel estimation associated with the DMRS.

Aspect 8: The method of any of aspects 1 through 7, wherein the DMRS is associated with a first time interval, and wherein the UE communicates in accordance with the precoder for at least a portion of the first time interval, the method further comprising: monitoring for a second DMRS according to the default precoder, the second DMRS associated with a second time interval different from the first time interval; transmitting a second uplink message indicating one or more additional candidate precoders selected based at least in part on the monitoring for the second DMRS according to the default precoder; receiving a second downlink message indicating a second precoder of the one or more additional candidate precoders based at least in part on transmitting the second uplink message; and communicating in accordance with the second precoder of the one or more additional candidate precoders for at least a portion of the second time interval and based at least in part on the second downlink message.

Aspect 9: The method of any of aspects 1 through 8, wherein the DMRS is associated with a default rank indicator, a default CQI, or both, the method further comprising: performing a channel estimation for the DMRS based at least in part on the default rank indicator, the default CQI, or both, wherein the one or more candidate precoders are selected based at least in part on the channel estimation.

Aspect 10: The method of aspect 9, further comprising: receiving control signaling indicating the default precoder, the default rank indicator, the default CQI, or any combination thereof, wherein monitoring for the DMRS, performing the channel estimation, or both, is based at least in part on the control signaling.

Aspect 11: The method of any of aspects 1 through 10, further comprising: performing a channel estimation for the DMRS based at least in part on the monitoring, wherein the one or more candidate precoders are selected from a precoder codebook based at least in part on the channel estimation.

Aspect 12: The method of any of aspects 1 through 11, wherein the uplink message is transmitted via an uplink shared channel.

Aspect 13: A method for wireless communication at a network entity, comprising: transmitting, to a UE, a DMRS according to a default precoder, the DMRS associated with CSF information; receiving an uplink message indicating one or more candidate precoders selected based at least in part on transmitting the DMRS according to the default precoder; transmitting a downlink message indicating a precoder of the one or more candidate precoders based at least in part on receiving the uplink message; and communicating with the UE in accordance with the indicated precoder of the one or more candidate precoders based at least in part on the downlink message.

Aspect 14: The method of aspect 13, further comprising: receiving, via the uplink message, one or more identifiers associated with the one or more candidate precoders; and transmitting, via the downlink message, an identifier associated with the precoder, the identifier included within the one or more identifiers, wherein communicating in accordance with the precoder is based at least in part on transmitting the identifier.

Aspect 15: The method of any of aspects 13 through 14, further comprising: communicating with the UE in accordance with the default precoder for at least a portion of a time interval between reception of the uplink message and transmission of the downlink message.

Aspect 16: The method of any of aspects 13 through 15, further comprising: receiving, via the uplink message, one or more candidate rank indicators, one or more candidate CQIs, or both, wherein the one or more candidate rank indicators, the one or more candidate CQIs, or both, are based at least in part on transmitting the DMRS according to the default precoder; and transmitting, via the downlink message, a rank indicator from the one or more candidate rank indicators, a CQI from the one or more candidate CQIs, or both, wherein communicating with the UE is performed in accordance with the indicated rank indicator, the indicated CQI, or both.

Aspect 17: The method of any of aspects 13 through 16, wherein the uplink message indicates a set of precoder coefficients associated with the precoder of the one or more candidate precoders.

Aspect 18: The method of any of aspects 13 through 17, wherein the DMRS is associated with a first time interval, and wherein the network entity communicates in accordance with the precoder for at least a portion of the first time interval, the method further comprising: transmitting a second DMRS according to the default precoder, the second DMRS associated with a second time interval different from the first time interval; receiving a second uplink message indicating one or more additional candidate precoders selected based at least in part on transmitting the second DMRS according to the default precoder; transmitting a second downlink message indicating a second precoder of the one or more additional candidate precoders based at least in part on receiving the second uplink message; and communicating in accordance with the second precoder of the one or more additional candidate precoders for at least a portion of the second time interval and based at least in part on the second downlink message.

Aspect 19: The method of any of aspects 13 through 18, further comprising: transmitting control signaling indicating a default precoder, a default rank indicator, a default CQI, or any combination thereof, wherein transmitting the DMRS, receiving the uplink message, or both, is based at least in part on the control signaling.

Aspect 20: The method of any of aspects 13 through 19, wherein the one or more candidate precoders are selected from a precoder codebook based at least in part on transmitting the DMRS according to the default precoder.

Aspect 21: The method of any of aspects 13 through 20, wherein the uplink message is received via an uplink shared channel.

Aspect 22: An apparatus for wireless communication at a UE, comprising a processor; memory coupled with the processor; and instructions stored in the memory and executable by the processor to cause the apparatus to perform a method of any of aspects 1 through 12.

Aspect 23: An apparatus for wireless communication at a UE, comprising at least one means for performing a method of any of aspects 1 through 12.

Aspect 24: A non-transitory computer-readable medium storing code for wireless communication at a UE, the code comprising instructions executable by a processor to perform a method of any of aspects 1 through 12.

Aspect 25: An apparatus for wireless communication at a network entity, comprising a processor; memory coupled with the processor; and instructions stored in the memory and executable by the processor to cause the apparatus to perform a method of any of aspects 13 through 21.

Aspect 26: An apparatus for wireless communication at a network entity, comprising at least one means for performing a method of any of aspects 13 through 21.

Aspect 27: A non-transitory computer-readable medium storing code for wireless communication at a network entity, the code comprising instructions executable by a processor to perform a method of any of aspects 13 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
    at least one processor;
    memory in electronic communication with the at least one processor; and
    instructions stored in the memory, wherein the instructions are executable by the at least one processor to:
        monitor for a demodulation reference signal according to a single default precoder, the demodulation reference signal associated with channel state feedback information, the single default precoder being associated with a quantity of transmit antennas greater than a quantity of transmission layer;
        transmit an uplink message indicating one or more candidate precoders selected based at least in part on the monitoring for the demodulation reference signal according to the single default precoder, the one or more candidate precoders including at least one precoder different from the single default precoder;
        receive a downlink message indicating a precoder of the one or more candidate precoders based at least in part on transmitting the uplink message; and
        communicate with a network entity in accordance with the indicated precoder of the one or more candidate precoders based at least in part on the downlink message.

2. The apparatus of claim 1, wherein the instructions are further executable by the at least one processor to:
    perform a channel estimation associated with the channel state feedback information based at least in part on the demodulation reference signal and the single default precoder, wherein the one or more candidate precoders are selected based at least in part on the channel estimation.

3. The apparatus of claim 2, wherein the instructions executable by the at least one processor to communicate with the network entity in accordance with the indicated precoder comprise instructions executable by the at least one processor to:
    receive a second downlink message in accordance with the indicated precoder; and
    perform digital post distortion correction on the second downlink message based at least in part on the channel estimation and the indicated precoder.

4. The apparatus of claim 3, wherein the second downlink message comprises a 256 quadrature amplitude modulation message.

5. The apparatus of claim 1, wherein the instructions are further executable by the at least one processor to:
    transmit, via the uplink message, one or more identifiers associated with the one or more candidate precoders; and
    receive, via the downlink message, an identifier associated with the precoder, the identifier included within the one or more identifiers, wherein communicating in accordance with the precoder is based at least in part on receiving the identifier.

6. The apparatus of claim 1, wherein the instructions are further executable by the at least one processor to:
    communicate with the network entity in accordance with the single default precoder for at least a portion of a time interval between transmission of the uplink message and reception of the downlink message.

7. The apparatus of claim 1, wherein the instructions are further executable by the at least one processor to:
    perform a channel estimation associated with the channel state feedback information based at least in part on the demodulation reference signal and the single default precoder;
    transmit, via the uplink message, one or more candidate rank indicators, one or more candidate channel quality indicators, or both, wherein the one or more candidate rank indicators, the one or more candidate channel quality indicators, or both, are determined based at least in part on the channel estimation; and
    receive, via the downlink message, a rank indicator from the one or more candidate rank indicators, a channel quality indicator from the one or more candidate channel quality indicators, or both, wherein communicating with the network entity is performed in accordance with the rank indicator, the channel quality indicator, or both.

8. The apparatus of claim 1, wherein the instructions executable by the at least one processor to transmit the uplink message indicating the one or more candidate precoders comprise instructions executable by the at least one processor to:
    indicate, via the uplink message, a set of precoder coefficients associated with the precoder of the one or more candidate precoders.

9. The apparatus of claim 8, wherein the instructions are further executable by the at least one processor to:
    determine the set of precoder coefficients associated with the precoder based at least in part on a channel estimation associated with the demodulation reference signal.

10. The apparatus of claim 1, wherein the demodulation reference signal is associated with a first time interval, and wherein the instructions are further executable by the at least one processor to:
    monitor for a second demodulation reference signal according to the single default precoder, the second demodulation reference signal associated with a second time interval different from the first time interval;
transmit a second uplink message indicating one or more additional candidate precoders selected based at least in part on the monitoring for the second demodulation reference signal according to the single default precoder;
receive a second downlink message indicating a second precoder of the one or more additional candidate precoders based at least in part on transmitting the second uplink message; and
communicate with the network entity in accordance with the second precoder of the one or more additional candidate precoders for at least a portion of the second time interval and based at least in part on the second downlink message.

11. The apparatus of claim 1, wherein the demodulation reference signal is associated with a default rank indicator, a default channel quality indicator, or both, and wherein the instructions are further executable by the at least one processor to:
perform a channel estimation for the demodulation reference signal based at least in part on the default rank indicator, the default channel quality indicator, or both, wherein the one or more candidate precoders are selected based at least in part on the channel estimation.

12. The apparatus of claim 11, wherein the instructions are further executable by the at least one processor to:
receive control signaling indicating the single default precoder, the default rank indicator, the default channel quality indicator, or any combination thereof, wherein monitoring for the demodulation reference signal, performing the channel estimation, or
both, is based at least in part on the control signaling.

13. The apparatus of claim 1, wherein the instructions are further executable by the at least one processor to:
perform a channel estimation for the demodulation reference signal based at least in part on the monitoring for the demodulation reference signal according to the single default precoder, wherein the one or more candidate precoders are selected from a precoder codebook based at least in part on the channel estimation.

14. The apparatus of claim 1, wherein the instructions are further executable by the at least one processor to:
generate, based at least in part on a measurement of the demodulation reference signal and based at least in part on the single default precoder, an estimation of a physical channel between the UE and the network entity, wherein the one or more candidate precoders are selected based at least in part on the estimation of a physical channel between the UE and the network entity.

15. An apparatus for wireless communication at a network entity, comprising:
at least one processor;
memory in electronic communication with the at least one processor; and
instructions stored in the memory, wherein the instructions are executable by the at least one processor to:
transmit a demodulation reference signal according to a single default precoder, the demodulation reference signal associated with channel state feedback information, the single default precoder being associated with a quantity of transmit antennas greater than a quantity of transmission layers;
receive an uplink message indicating one or more candidate precoders selected based at least in part on transmitting the demodulation reference signal according to the single default precoder, the one or more candidate precoders including at least one precoder different from the single default precoder;
transmit a downlink message indicating a precoder of the one or more candidate precoders based at least in part on receiving the uplink message; and
communicate in accordance with the indicated precoder of the one or more candidate precoders based at least in part on the downlink message.

16. The apparatus of claim 15, wherein the instructions are further executable by the at least one processor to:
receive, via the uplink message, one or more identifiers associated with the one or more candidate precoders; and
transmit, via the downlink message, an identifier associated with the precoder, the identifier included within the one or more identifiers, wherein communicating in accordance with the precoder is based at least in part on transmitting the identifier.

17. The apparatus of claim 15, wherein the instructions are further executable by the at least one processor to:
communicate in accordance with the single default precoder for at least a portion of a time interval between reception of the uplink message and transmission of the downlink message.

18. The apparatus of claim 15, wherein the instructions are further executable by the at least one processor to:
receive, via the uplink message, one or more candidate rank indicators, one or more candidate channel quality indicators, or both, wherein the one or more candidate rank indicators, the one or more candidate channel quality indicators, or both, are based at least in part on transmitting the demodulation reference signal according to the single default precoder; and
transmit, via the downlink message, a rank indicator from the one or more candidate rank indicators, a channel quality indicator from the one or more candidate channel quality indicators, or both, wherein the communicating is performed in accordance with the rank indicator, the channel quality indicator, or both.

19. The apparatus of claim 15, wherein the uplink message indicates a set of precoder coefficients associated with the precoder of the one or more candidate precoders.

20. The apparatus of claim 15, wherein the demodulation reference signal is associated with a first time interval, and wherein the instructions are further executable by the at least one processor to:
transmit a second demodulation reference signal according to the single default precoder, the second demodulation reference signal associated with a second time interval different from the first time interval;
receive a second uplink message indicating one or more additional candidate precoders selected based at least in part on transmitting the second demodulation reference signal according to the single default precoder;
transmit a second downlink message indicating a second precoder of the one or more additional candidate precoders based at least in part on receiving the second uplink message; and
communicate in accordance with the second precoder of the one or more additional candidate precoders for at least a portion of the second time interval and based at least in part on the second downlink message.

21. The apparatus of claim 15, wherein the instructions are further executable by the at least one processor to:

transmit control signaling indicating the single default precoder, a default rank indicator, a default channel quality indicator, or any combination thereof, wherein transmitting the demodulation reference signal, receiving the uplink message, or both, is based at least in part on the control signaling.

22. The apparatus of claim 15, wherein the one or more candidate precoders are selected from a precoder codebook based at least in part on transmitting the demodulation reference signal according to the single default precoder.

23. A method for wireless communication at a user equipment (UE), comprising:
monitoring for a demodulation reference signal according to a single default precoder, the demodulation reference signal associated with channel state feedback information, the single default precoder being associated with a quantity of transmit antennas greater than a quantity of transmission layers;
transmitting an uplink message indicating one or more candidate precoders selected based at least in part on the monitoring for the demodulation reference signal according to the single default precoder, the one or more candidate precoders including at least one precoder different from the single default precoder;
receiving a downlink message indicating a precoder of the one or more candidate precoders based at least in part on transmitting the uplink message; and
communicating with a network entity in accordance with the indicated precoder of the one or more candidate precoders based at least in part on the downlink message.

24. The method of claim 23, further comprising:
performing a channel estimation associated with the channel state feedback information based at least in part on the demodulation reference signal and the single default precoder, wherein the one or more candidate precoders are selected based at least in part on the channel estimation.

25. The method of claim 23, further comprising:
transmitting, via the uplink message, one or more identifiers associated with the one or more candidate precoders; and
receiving, via the downlink message, an identifier associated with the precoder, the identifier included within the one or more identifiers, wherein communicating in accordance with the precoder is based at least in part on receiving the identifier.

26. The method of claim 23, further comprising:
communicating with the network entity in accordance with the single default precoder for at least a portion of a time interval between transmission of the uplink message and reception of the downlink message.

27. The method of claim 23, further comprising:
performing a channel estimation associated with the channel state feedback information based at least in part on the demodulation reference signal and the single default precoder;
transmitting, via the uplink message, one or more candidate rank indicators, one or more candidate channel quality indicators, or both, wherein the one or more candidate rank indicators, the one or more candidate channel quality indicators, or both, are determined based at least in part on the channel estimation; and
receiving, via the downlink message, a rank indicator from the one or more candidate rank indicators, a channel quality indicator from the one or more candidate channel quality indicators, or both, wherein communicating with the network entity is performed in accordance with the rank indicator, the channel quality indicator, or both.

28. The method of claim 23, wherein transmitting the uplink message indicating the one or more candidate precoders comprises:
indicating, via the uplink message, a set of precoder coefficients associated with the precoder of the one or more candidate precoders.

29. The method of claim 28, further comprising:
determining the set of precoder coefficients associated with the precoder based at least in part on a channel estimation associated with the demodulation reference signal.

30. A method for wireless communication at a network entity, comprising:
transmitting a demodulation reference signal according to a single default precoder, the demodulation reference signal associated with channel state feedback information, the single default precoder being associated with a quantity of transmit antennas greater than a quantity of transmission layers;
receiving an uplink message indicating one or more candidate precoders selected based at least in part on transmitting the demodulation reference signal according to the single default precoder, the one or more candidate precoders including at least one precoder different from the single default precoder;
transmitting a downlink message indicating a precoder of the one or more candidate precoders based at least in part on receiving the uplink message; and
communicating in accordance with the indicated precoder of the one or more candidate precoders based at least in part on the downlink message.

* * * * *